(12) United States Patent
Hudman et al.

(10) Patent No.: US 7,878,658 B2
(45) Date of Patent: Feb. 1, 2011

(54) DISTORTION AND POLARIZATION ALTERATION IN MEMS BASED PROJECTORS OR THE LIKE

(75) Inventors: Joshua M. Hudman, Redmond, WA (US); Joshua O. Miller, Woodinville, WA (US)

(73) Assignee: Microvision, inc., Redmond, WA (US)

( * ) Notice: Subject to any disclaimer, the term of this patent is extended or adjusted under 35 U.S.C. 154(b) by 474 days.

(21) Appl. No.: 12/105,549

(22) Filed: Apr. 18, 2008

(65) Prior Publication Data

US 2008/0225366 A1  Sep. 18, 2008

Related U.S. Application Data

(63) Continuation-in-part of application No. 11/758,380, filed on Jun. 5, 2007, now abandoned, and a continuation-in-part of application No. 11/786,423, filed on Apr. 10, 2007, now Pat. No. 7,834,867.

(60) Provisional application No. 60/811,655, filed on Jun. 6, 2006, provisional application No. 60/791,074, filed on Apr. 11, 2006.

(51) Int. Cl.
*G03B 21/14* (2006.01)
(52) U.S. Cl. .................. 353/38; 353/81; 359/207.5; 359/831
(58) Field of Classification Search ... 359/196.1–226.3, 359/831–837; 345/7, 8, 9; 353/20, 38, 46, 353/50, 51, 81
See application file for complete search history.

(56) References Cited

U.S. PATENT DOCUMENTS

| 5,045,983 | A  | 9/1991  | Shields et al. |
| 5,767,924 | A  | 6/1998  | Hiroki et al. |
| 5,920,361 | A  | 7/1999  | Gibeau et al. |
| 6,218,679 | B1 | 4/2001  | Takahara et al. |
| 6,295,154 | B1 | 9/2001  | Laor et al. |
| 6,480,325 | B1 | 11/2002 | Batchko et al. |
| 6,512,622 | B2 | 1/2003  | Wine |
| 6,540,361 | B1 | 4/2003  | Hayashi |
| 6,542,307 | B2 | 4/2003  | Gleckman et al. |

(Continued)

FOREIGN PATENT DOCUMENTS

WO     WO0210855     2/2002

(Continued)

*Primary Examiner*—Stephone B Allen
*Assistant Examiner*—Jennifer L. Doak
(74) *Attorney, Agent, or Firm*—Kevin D. Wills

(57) ABSTRACT

Briefly, in accordance with one or more embodiments, a prism capable of being utilized in a scanned beam projector comprises a first window disposed on a first surface through which the beam is capable of passing to impinge upon a scan engine at an angle of incidence off axis from an axis normal to a plane of the scan engine, and a second window disposed on a second surface through which the beam is capable of passing. The first surface of the prism is disposed at a non-parallel angle with respect to the second surface to reduce distortion of the scan pattern or image from the scan engine. The prism may further comprise one or more internal surfaces capable of reflecting the beam onto the scan engine off axis, where such reflecting may impart a desired polarization state to the beam reflected onto the scan engine.

8 Claims, 34 Drawing Sheets

U.S. PATENT DOCUMENTS

| | | |
|---|---|---|
| 6,590,606 B1 | 7/2003 | Hiller et al. |
| 6,926,411 B2 * | 8/2005 | Ouchi et al. ............... 353/20 |
| 2001/0022566 A1 | 9/2001 | Okazaki |
| 2002/0190922 A1 | 12/2002 | Tsao |
| 2003/0011751 A1 | 1/2003 | Sakata et al. |
| 2004/0080718 A1 | 4/2004 | Kojima |
| 2005/0190426 A1 * | 9/2005 | Urakawa et al. ............ 359/224 |

FOREIGN PATENT DOCUMENTS

| | | |
|---|---|---|
| WO | WO02/091077 | 11/2002 |

* cited by examiner

1600

```
┌─ 1610
│ REFLECT A LIGHT BEAM OFF OF A FIRST STATIC MIRROR
│ TOWARD A MEMS SCANNING MIRROR FROM AN
│ INCIDENT PATH THAT IS SUBSTANTIALLY PERPENDICULAR
│ TO THE SCANNING MIRROR'S NORMAL
└─
        ↓
┌─ 1620
│ REFLECT THE LIGHT BEAM OFF OF THE MEMS
│ SCANNING MIRROR TOWARD A SECOND STATIC MIRROR
└─
        ↓
┌─ 1630
│ REFLECT THE LIGHT BEAM FROM THE MEMS
│ SCANNING MIRROR OFF OF A SECOND STATIC MIRROR
│ ALONG A PATH SUBSTANTIALLY PERPENDICULAR TO
│ THE SCANNING MIRROR'S NORMAL FOR EXTERNAL
│ PROJECTION
└─
```

1710 — TRANSMIT A LIGHT BEAM THROUGH A TOTAL INTERNAL REFLECTION PRISM WHEREIN THE LIGHT BEAM ENTERS THE PRISM ALONG A PATH SUBSTANTIALLY PERPENDICULAR TO A MEMS SCANNING MIRROR'S NORMAL, AND AFTER BEING REFLECTED WITHIN THE PRISM, EXITS THE PRISM ALONG A SECOND PATH TOWARDS THE MEMS SCANNING MIRROR

1720 — TRANSMIT THE BEAM AFTER, IT EXITS THE PRISM, THROUGH A QUARTER WAVE PLATE

1730 — REFLECT THE BEAM OFF OF THE SCANNING MIRROR AND THROUGH THE QUARTER WAVE PLATE

1740 — REFLECT THE BEAM FROM THE QUARTER WAVE PLATE OFF OF A REFLECTIVE SURFACE FOR EXTERNAL PROJECTION

1810 — TRANSMIT A LIGHT BEAM THROUGH A TOTAL INTERNAL REFLECTION PRISM WHEREIN THE LIGHT BEAM ENTERS THE PRISM ALONG A PATH SUBSTANTIALLY PERPENDICULAR TO A MEMS SCANNING MIRROR'S NORMAL, AND AFTER BEING REFLECTED WITHIN THE PRISM, EXITS THE PRISM ALONG A SECOND PATH TOWARDS THE MEMS SCANNING MIRROR

1820 — REFLECT THE BEAM OFF OF THE SCANNING MIRROR

1830 — REFLECT THE BEAM FROM THE SCANNING MIRROR OFF OF A SECOND PRISM THROUGH WHICH THE BEAM PASSED BEFORE BEING REFLECTED BY THE SCANNING MIRROR FOR EXTERNAL PROJECTION

1910 — RECEIVE A LIGHT BEAM INCIDENT A FIRST SURFACE OF AN OPTICAL COMPONENT AND INTERNALLY REFLECT THE LIGHT BEAM TOWARDS A SECOND SURFACE OF THE OPTICAL COMPONENT

1920 — REFLECT THE LIGHT BEAM EXITING THE OPTICAL COMPONENT FROM THE SECOND SURFACE OFF OF A MEMS SCANNING MIRROR BACK THROUGH THE OPTICAL COMPONENT FOR EXTERNAL PROJECTION

1930 — RECEIVE THE LIGHT BEAM FROM THE MEMS SCANNING MIRROR ALONG A FIRST PATH AT A FIRST ANGLE RELATIVE TO A NORMAL OF AN OPTICAL SLAB OF THE OPTICAL COMPONENT, THE OPTICAL SLAB HAVING A THICKNESS AND AN INDEX

1940 — REFRACT THE LIGHT BEAM THROUGH THE OPTICAL SLAB SUCH THAT THE LIGHT BEAM EXITS THE OPTICAL SLAB ALONG A SECOND PATH AT AN ANGLE RELATIVE TO THE NORMAL OF THE OPTICAL SLAB HAVING A VALUE EQUAL TO THE VALUE OF THE FIRST ANGLE, WHEREIN A DISTANCE BETWEEN THE FIRST PATH AND THE SECOND PATH IS A FUNCTION OF THE THICKNESS OR INDEX VALUE OF THE OPTICAL SLAB

POSITION A MEMS SCANNING MIRROR ALONG A FIRST PLANE ORIENTED IN A FIRST DIRECTION OF A FIRST DIMENSION

2020

REFLECT A LIGHT BEAM FROM A FIRST PATH OFF OF A FIRST REFLECTIVE SURFACE TOWARDS A MEMS SCANNING MIRROR , WHEREIN THE FIRST REFLECTIVE SURFACE IS POSITIONED ALONG A SECOND PLANE ORIENTED IN A SECOND DIRECTION OF THE FIRST DIMENSION, AND WHEREIN THE FIRST AND SECOND PLANES ARE SPATIALLY SEPARATED ALONG A SECOND DIMENSION

*FIG. 20*

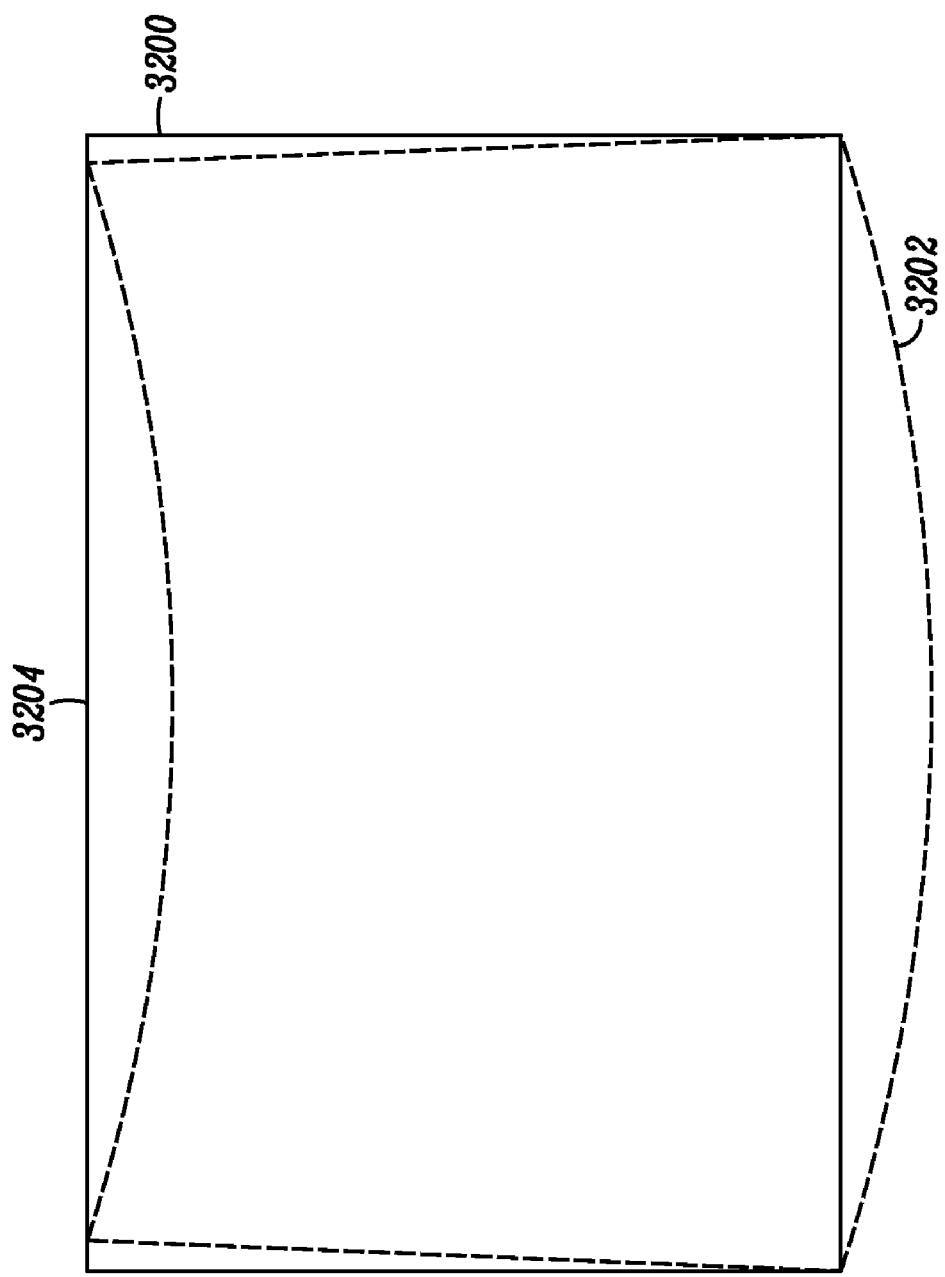

US 7,878,658 B2

DISTORTION AND POLARIZATION ALTERATION IN MEMS BASED PROJECTORS OR THE LIKE

CROSS-REFERENCE TO RELATED APPLICATIONS

The present application is a continuation-in-part of U.S. application Ser. No. 11/758,380 filed Jun. 5, 2007 (pending), which in turn claims the benefit of U.S. Provisional Application No. 60/811,655 filed Jun. 6, 2006 (expired). Said U.S. application Ser. No. 11/758,380 is a continuation-in-part of U.S. application Ser. No. 11/786,423 filed Apr. 10, 2007 (pending), which in turn claims the benefit of U.S. Provisional Application No. 60/791,074 filed Apr. 11, 2006 (expired). Said U.S. application Ser. No. 11/758,380, said U.S. application Ser. No. 11/786,423, said U.S. Provisional Application No. 60/811,655, and said U.S. Provisional Application No. 60/791,074 are hereby incorporated herein by reference in their entireties.

BACKGROUND

Projecting an image from a user equipment device onto an external screen may typically be performed by reflecting a light beam at a particular frequency in the X and Y directions. The light beam may be emitted using a number of lasers or diodes and may be scanned/modulated by a scanning mirror for external projection. For example, in the case of 1D scanners, the scanner may include a first beam director driven to scan the output beam along a single axis and a second beam director driven to scan the output beam in a second axis. In such a system, both scanners are referred to as a scanner. In the case of a 2D scanner, the scanner is driven to scan the output beam along a plurality of axes to sequentially illuminate pixels in the field of view to produce the projected image.

A scanned beam projector comprising MEMS based engine or the like may have difficulty feeding the beam onto the scan engine and out into the image plane without changing the scan cone by an undesirable amount, adding distortion to the image, and/or changing the polarization state of the input beam without costly polarization coatings. Typically, MEMS based scanning projectors may employ reflective fold mirrors to direct the beam to be scanned off axis from the scanning element of the scan engine, which may result in undesirable polarization rotation. Alternatively, a beam splitter may be employed on axis to address such scanning distortion, however such an arrangement may result in undesirable stray light image artifacts.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 22:
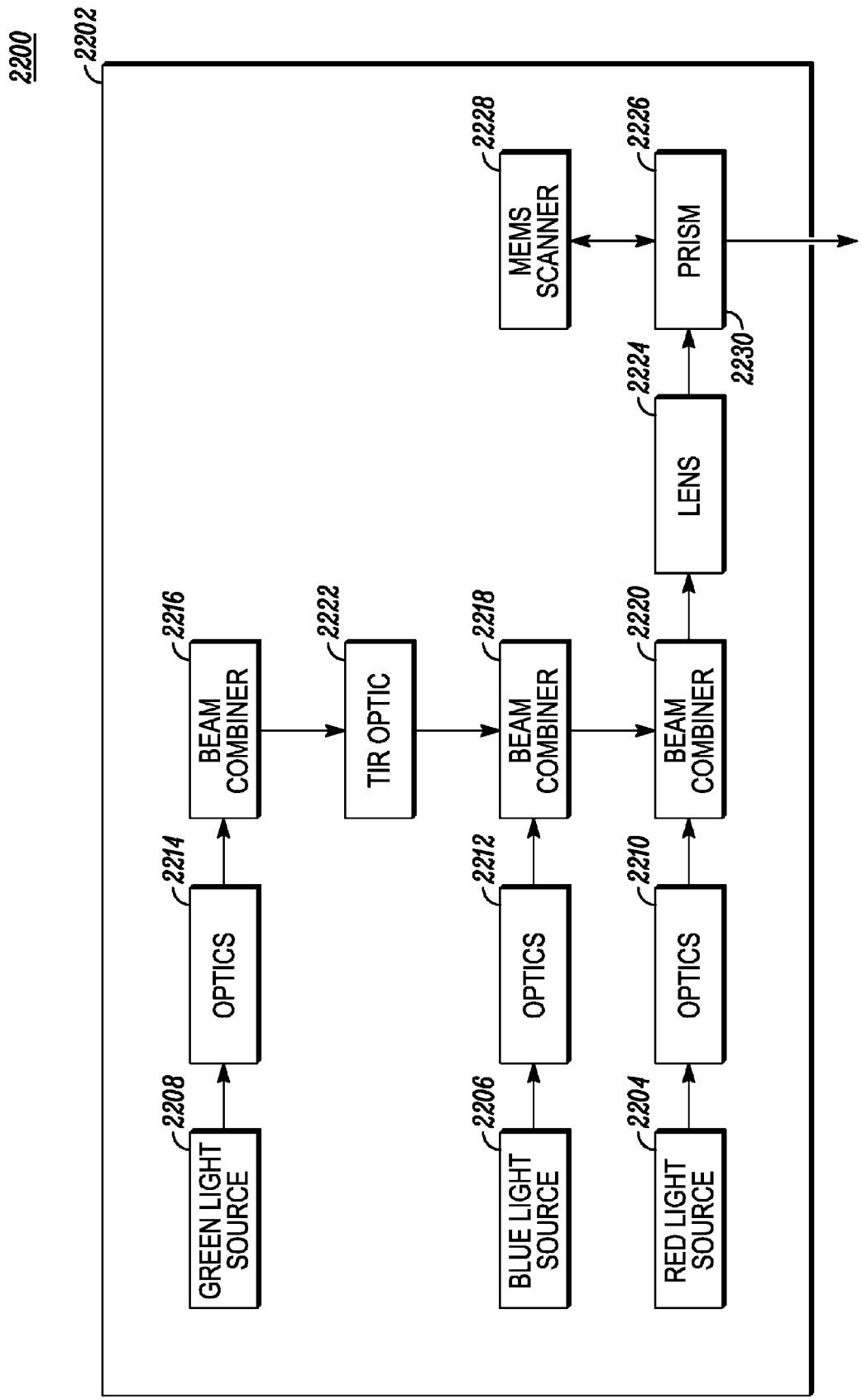
Figure 23:
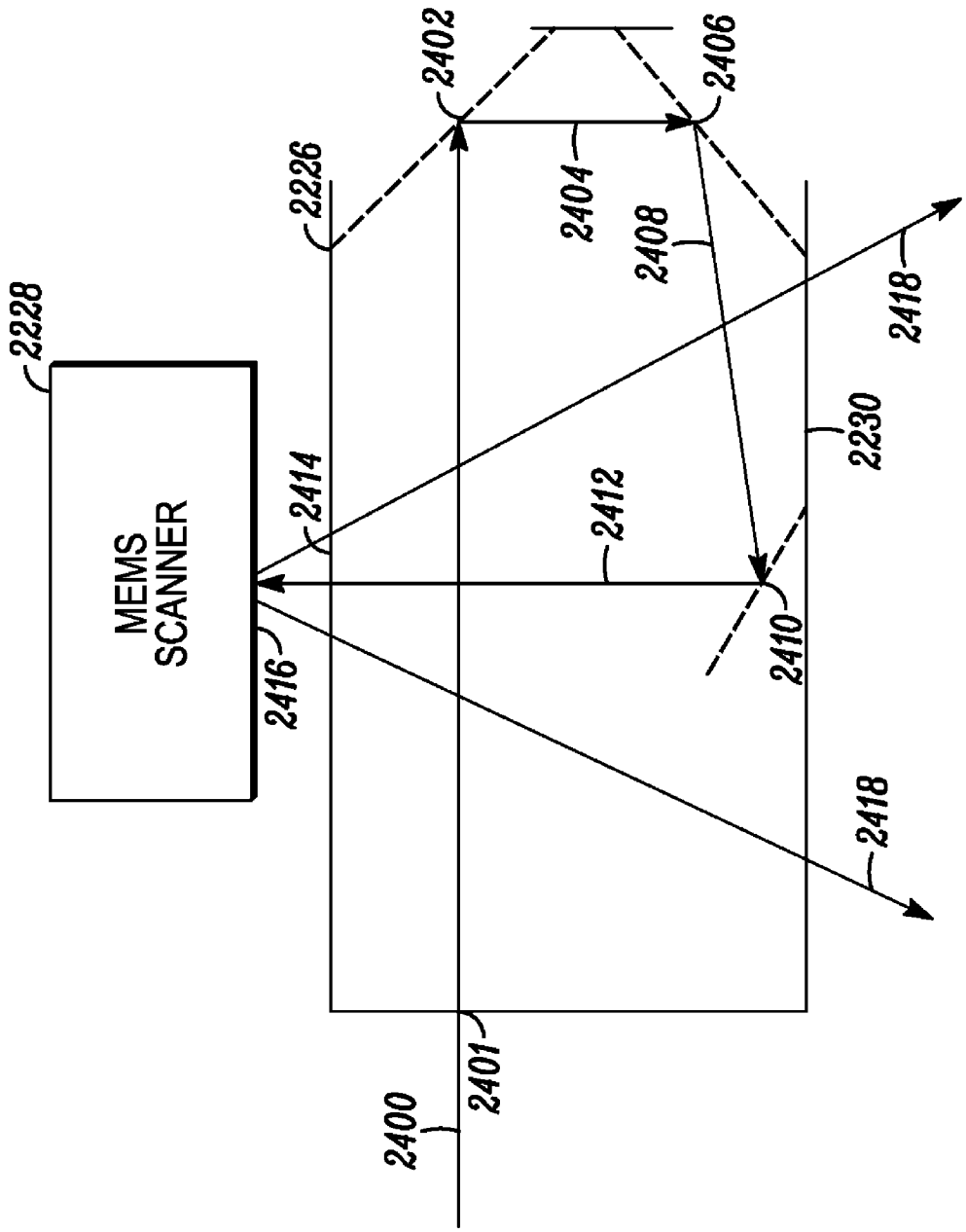
Figure 24:
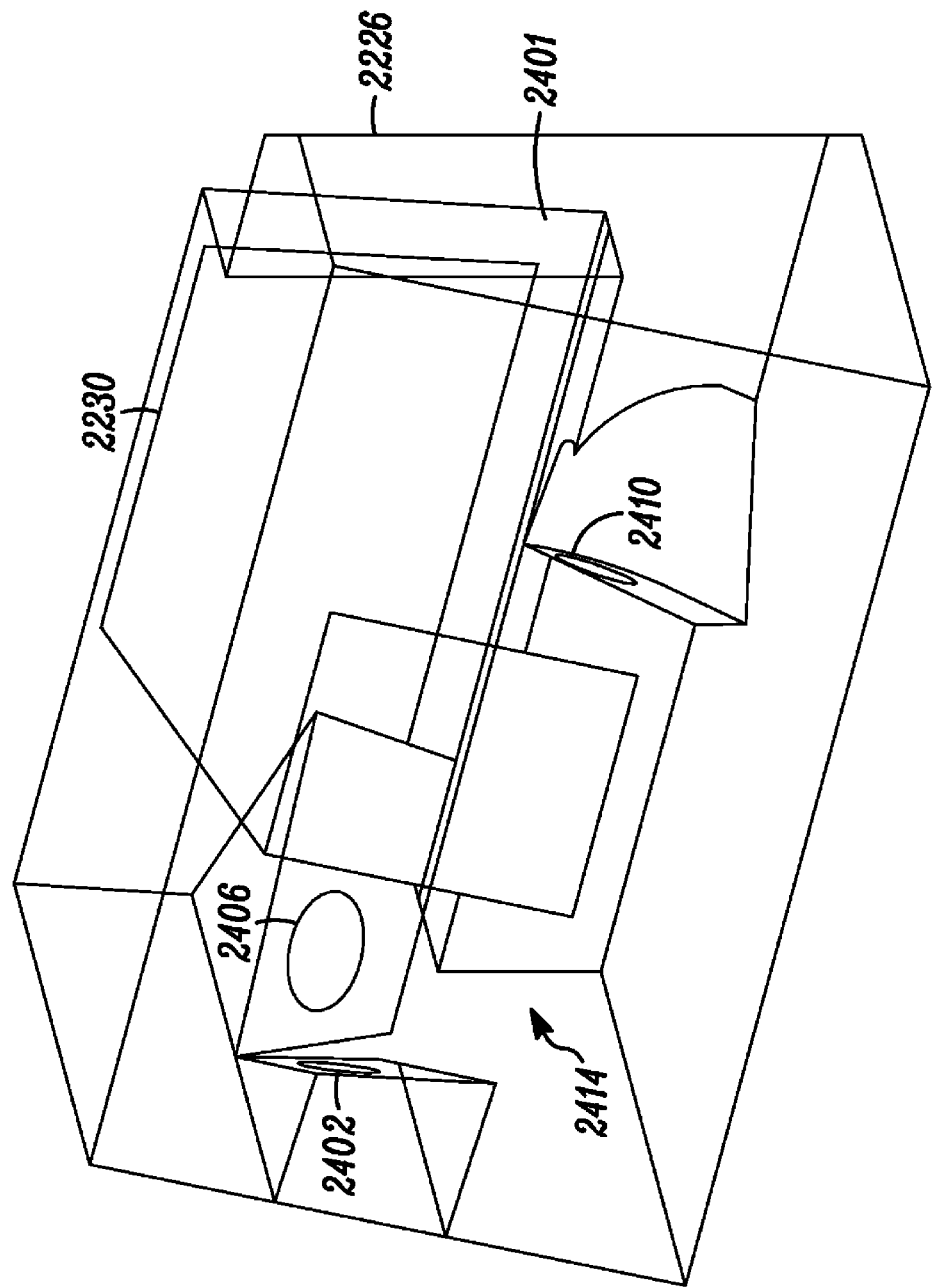
Figure 25:
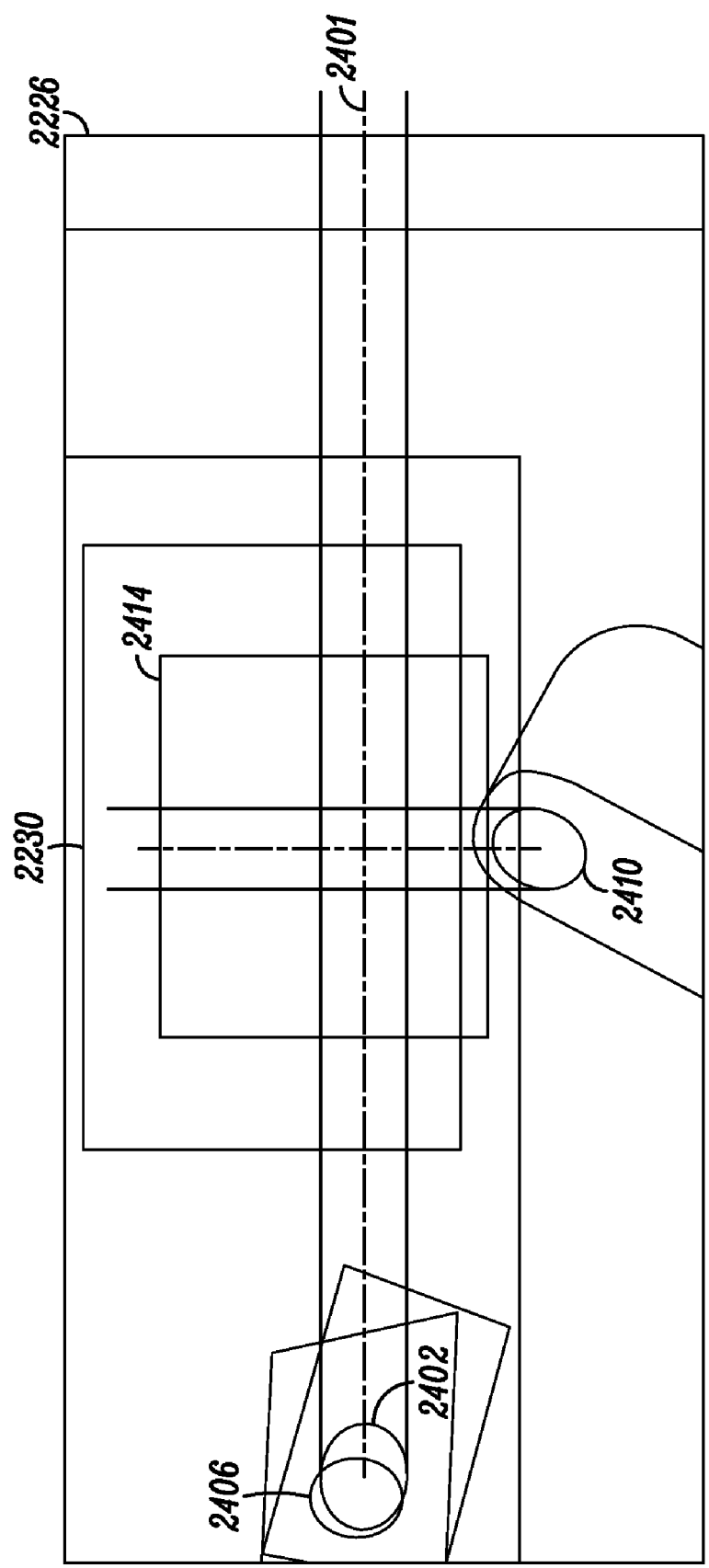
Figure 26:
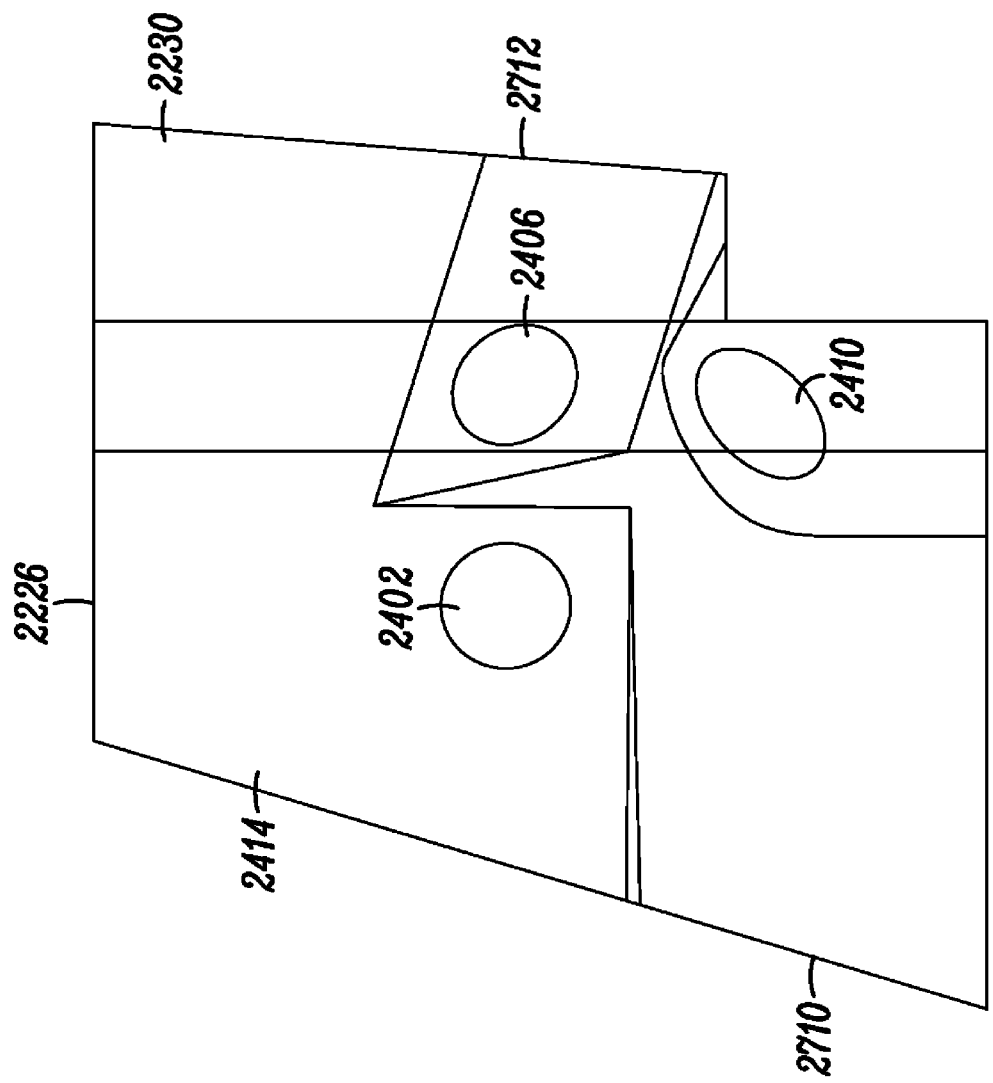
Figure 27:
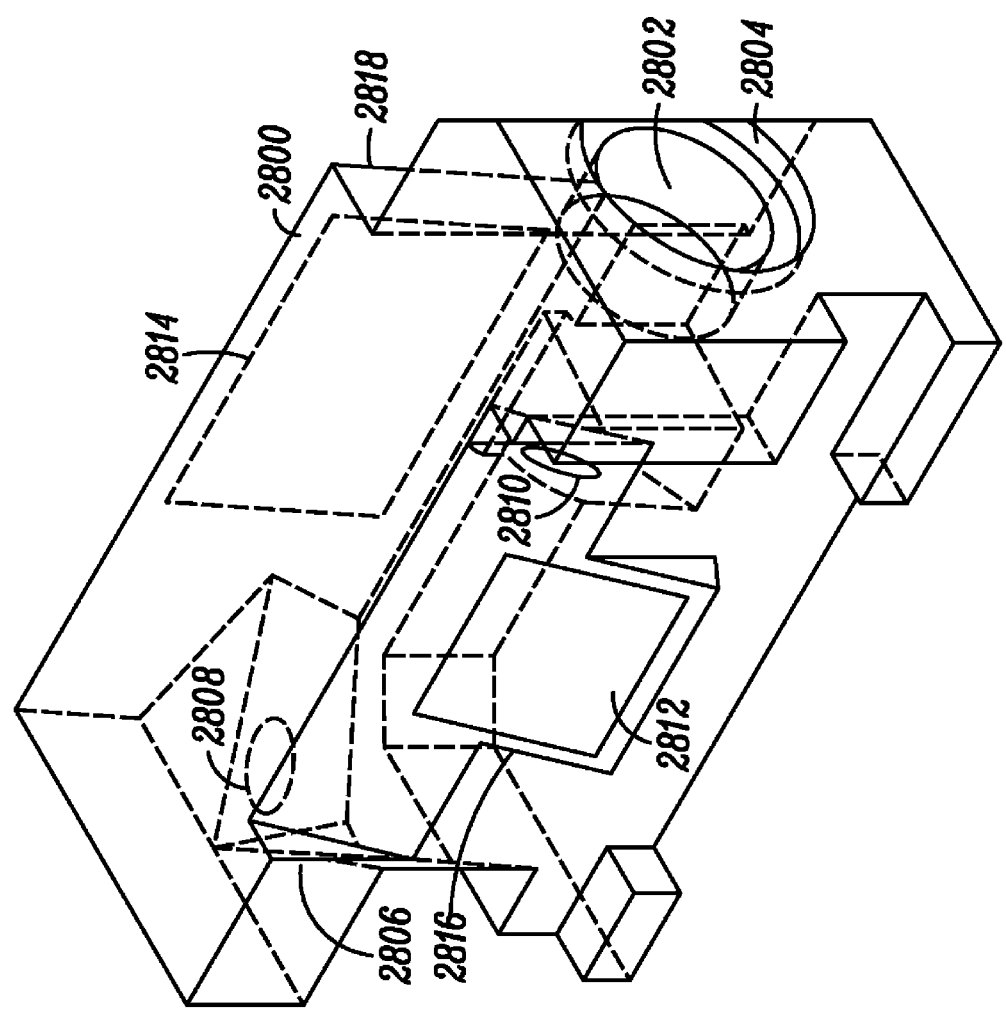
Figure 28:
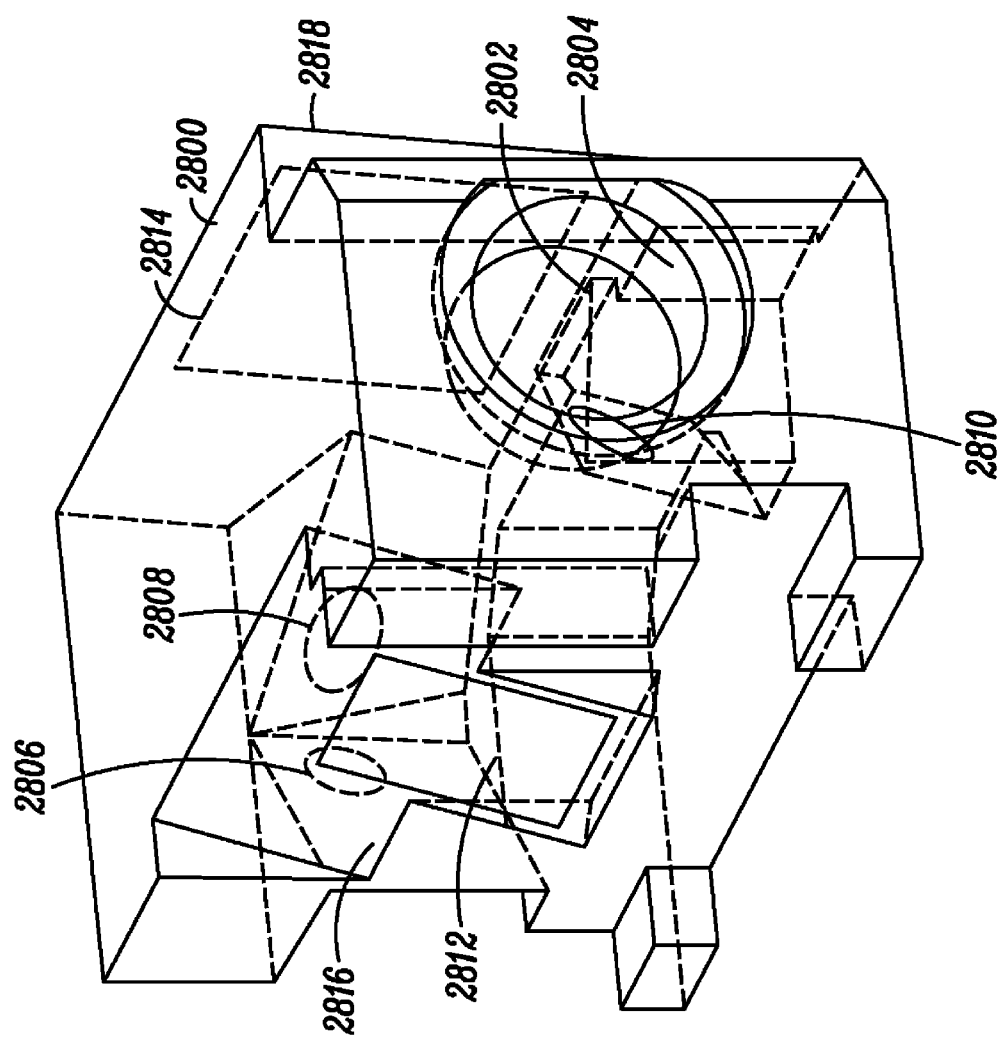
Figure 29:
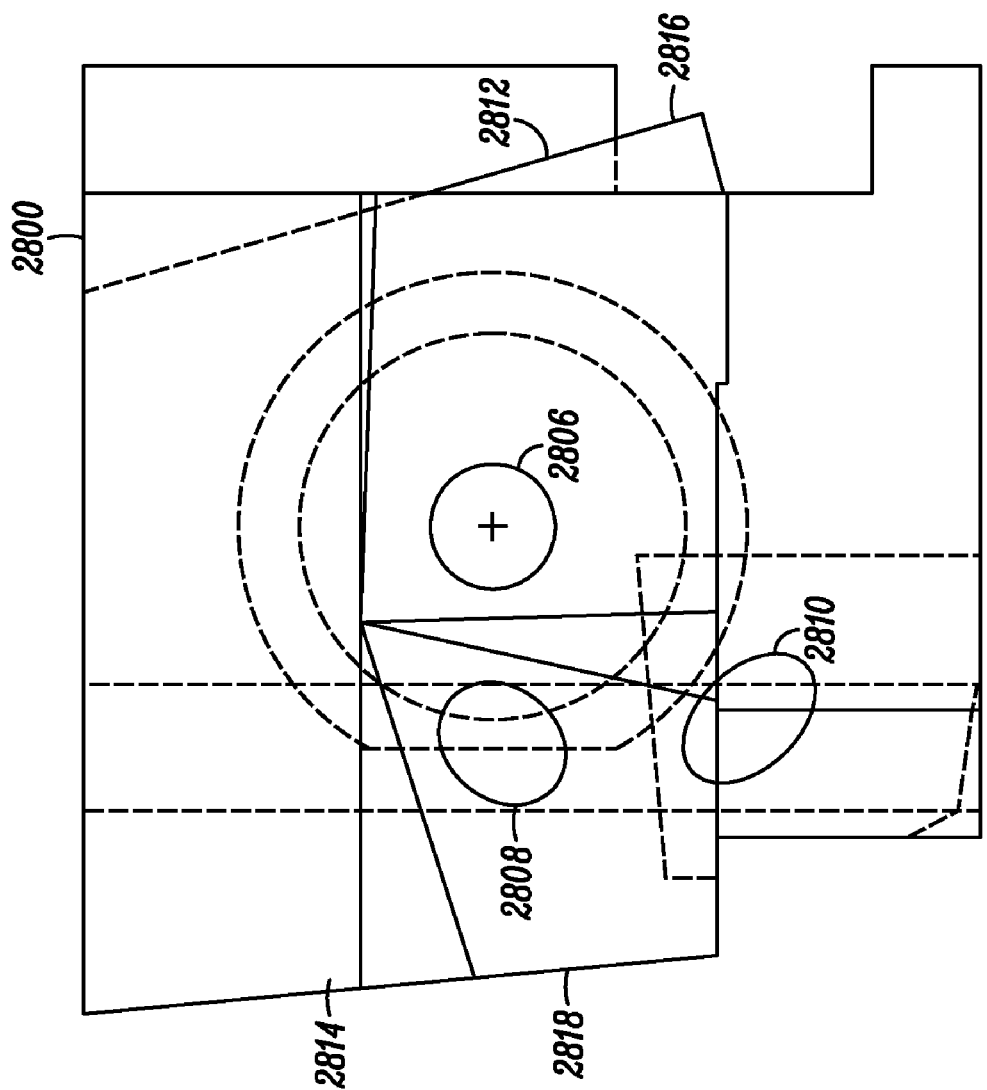
Figure 30:
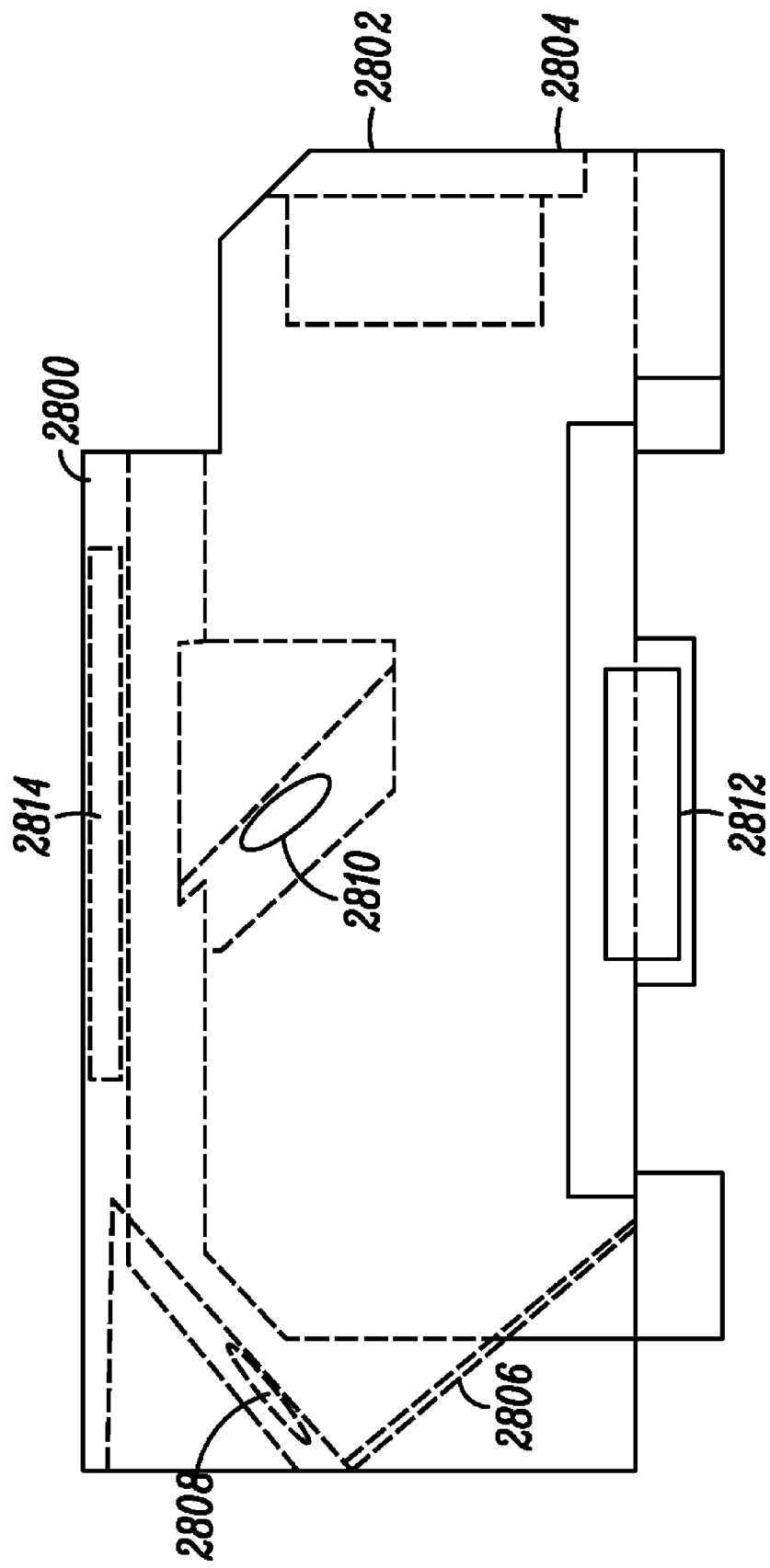

FIG. 16 a flow diagram for projecting an input beam using two static mirrors in accordance with one or more embodiments;

FIG. 17 is a flow diagram for projecting an input beam using a prism with a polarization reflective coating in accordance with one or more embodiments;

FIG. 18 is a flow diagram for projecting an input beam using two prisms in accordance with one or more embodiments;

FIG. 19 is a flow diagram for projecting an input beam using an optical component in accordance with one or more embodiments;

FIG. 20 is a diagram for projecting an input beam using a reflective surface in accordance with one or more embodiments;

FIG. 21a through FIG. 21f are diagrams of a device that may house a small form factor projector in accordance with one or more embodiments;

FIG. 22 is block diagram of a projector in accordance with one or more embodiments;

FIG. 23 is a top plan view of a prism capable of being utilized to provide distortion and/or polarization alteration in a MEMS based display or the like in accordance with one or more embodiments;

FIG. 24 is an isometric view of the prism of FIG. 23 in accordance with one or more embodiments;

FIG. 25 is a front elevation view of the prism of FIG. 23 in accordance with one or more embodiments;

FIG. 26 is a side elevation view of the prism of FIG. 23 in accordance with one or more embodiments;

FIG. 27 is an isometric view of an alternative prism capable of being utilized to provide distortion and/or polarization alteration in a MEMS based display or the like in accordance with one or more embodiments;

FIG. 28 is another isometric view of the prism of FIG. 27 in accordance with one or more embodiments;

FIG. 29 is a side elevation view of the prism of FIG. 27 in accordance with one or more embodiments;

FIG. 30 is a top plan view of the prism of FIG. 27 in accordance with one or more embodiments; and FIG. 31 is a diagram of alteration of image distortion with a prism as shown in FIG. 23 and/or FIG. 27 in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
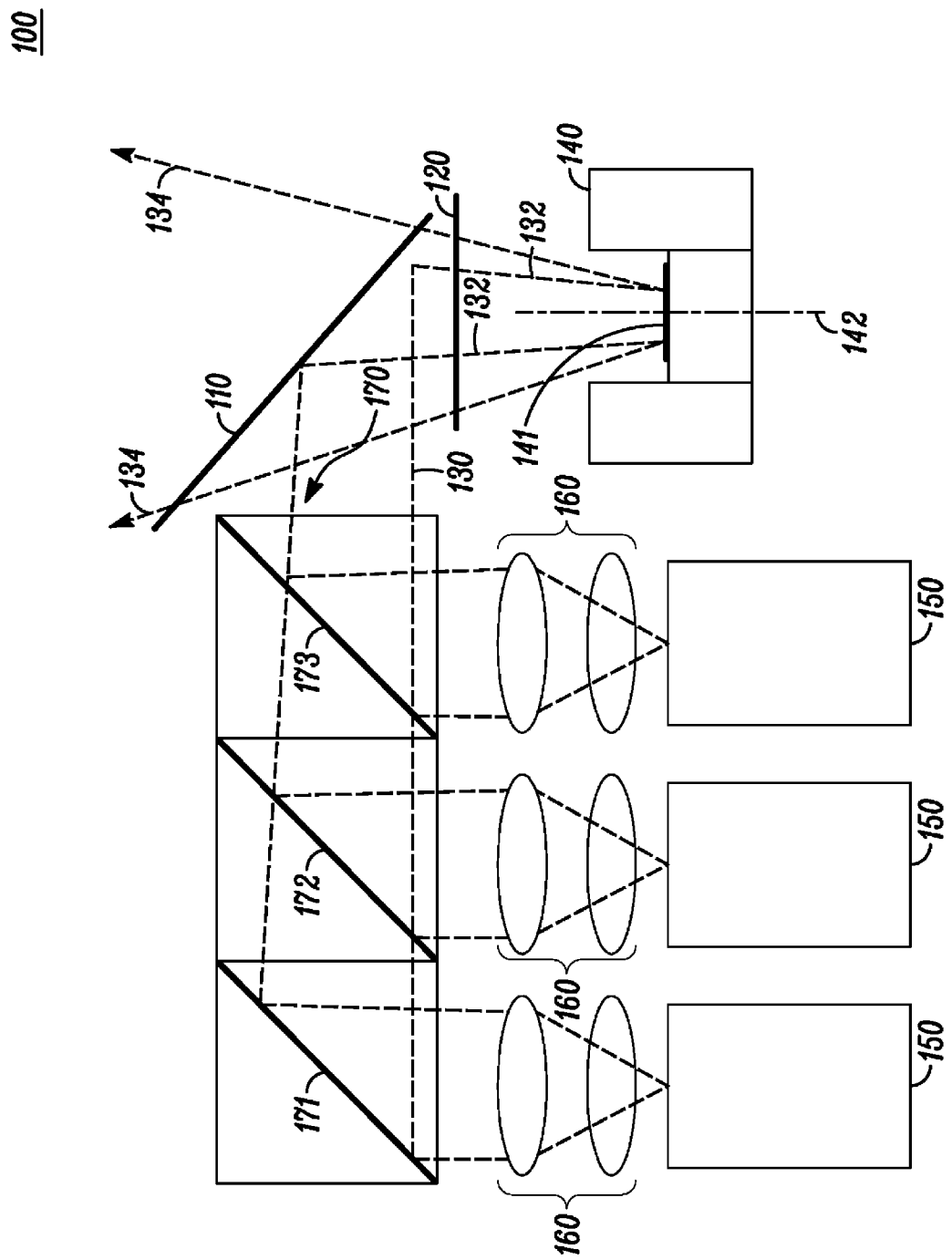
FIG. 1 is a diagram of a MEMS-based projector projecting an input beam using a selective fold mirror in accordance with one or more embodiments.

FIG. 1 is a diagram of a MEMS-based projector 100 with an s-polarized input beam propagated substantially perpendicular to the normal of the mirror of a MEMS scanner. MEMS-based projector 100 may include at least a MEMS scanner 140, a polarization rotator 120, a selective fold mirror 110, light sources 150, beam shaping optics 160, and a beam combiner 170. Light sources 150 may be configured to launch beams of modulated light through their respective beam shaping optics 160 toward beam combiner 170. Light sources 150 may include multiple emitters such as, for instance, light emitting diodes (LEDs), lasers, thermal sources, arc sources, fluorescent sources, gas discharge sources, or other types of emitters.

According to one embodiment, light sources 150 may include a red laser diode having a wavelength of approximately 635 to 670 nanometers (nm). According to another embodiment, light sources 150 may include three lasers including a red diode laser operable to emit a beam at approximately 635 nm; a green diode-pumped solid state (DPSS) laser such as frequency-doubling or second harmonic generation (SHG) laser excited by an infrared laser diode at about 1064 nm wavelength, the green SHG laser being operable to emit a green beam of light at about 532 nm; and a blue laser diode operable to emit light at about 473 nm.

While some lasers may be directly modulated, other lasers may require external modulation such as an acousto-optic modulator (AOM) for instance. In the case where an external modulator is used, it is considered part of the light source 150.

Light sources 150 may be configured to emit polarized beams of light. Alternatively, any one of beam shaping optics 160 may include a polarizer configured to provide s-polarized light to beam combiner 170. However, in some other embodiments, described in connection with FIGS. 2 and 4, it may be desirable for light sources 150 to emit a p-polarized light beam in order for the beam to pass through selective fold mirror 110 such as a polarized beam splitter described below.

The mirrors 171, 172, and 173 which may be housed in beam combiner 170 may be configured to combine only the s-polarized components of the input beams and pass the p-polarized components toward a light trap (not shown). Alternatively, in accordance with other embodiments mirrors 171, 172, and 173 may be configured to provide the opposite effect (e.g., combine only the p-polarized components and pass the s-polarized components). Mirrors 171, 172, and 173 may alternatively be static mirrors operable to simply reflect the entire beams received from light sources 150. Mirrors 171, 172, and 173 may combine the beams of modulated light from light sources 150 into a modulated composite beam 130 of s-polarized light (or p-polarized light in other embodiments).

Although only three light sources 160 and respective shaping optics and mirrors are drawn, it should be understood that any number of light sources may be provided to emit light to form composite beam 130. For example, only two light sources 150 may emit a light beams to beam combiner 170. It should also be understood that beam combiner may be omitted and replaced with a static mirror without departing from the scope of the claimed subject matter. This may be desired when a single light source 150 (thereby obviating the need to combine beams) or when light source 150 already emits a composite beam of light as described above.

A selective fold mirror 110 such as a polarizing beam splitter may direct modulated composite beam 130 toward the mirror 141 of a MEMS scanner 140. Selective fold mirror 110 may be aligned to reflect composite beam 130 toward the mirror of MEMS scanner 140 from a direction substantially normal to the nominal mirror (center crossing) position. Such an arrangement may be useful to minimize geometric distortion in the scanned beam.

For example, selective fold mirror 110 may be oriented to reflect s-polarized composite beam 130 towards the mirror of MEMS scanner 140. Composite beam 130 may travel along a first path that is substantially perpendicular to the normal 142 of the mirror of MEMS scanner 140. Composite beam 130 may be received by selective fold mirror 110 and reflected 90 degrees towards the mirror of MEMS scanner 140. In particular, the reflected light beam 132 may travel along a second path which may be substantially parallel to the normal 142 of the mirror of MEMS scanner 140.

Alternatively, composite beam 130 may travel along a first path that is at an oblique (or acute) angle to the normal of the mirror of MEMS scanner 140. Selective fold mirror 110 may be oriented at a different angle than the one drawn to reflect composite beam 130 towards the mirror of MEMS scanner 140. For example, the angle formed between composite beam 130 and the plane of selective fold mirror 110 may determine the angle formed between composite beam 130 and beam 134. In particular, the angle formed between composite beam 130 and beam 134 may be equal to twice the value of the angle formed between composite beam 130 and the plane of selective fold mirror 110. Alternatively, MEMS scanner 140 may be positioned relative to selective fold mirror 110 to receive reflected light beam 132 thereby obviating the need to reposition selective fold mirror 110.

Selective fold mirror 110 may be configured to preferentially reflect s-polarized light and thus reflects s-polarized light toward the mirror of MEMS scanner 140. The s-polarized modulated light beam 132 may pass through polarization rotator 120 on its path toward the mirror of MEMS scanner 140. Polarization rotator 120 may be configured as a quarter-wave plate and may be operative to convert the s-polarized light to circularly polarized light before it impinges upon the mirror of MEMS scanner 140.

As described above, MEMS scanner 140 may be operable to scan the beam in a periodic pattern across a field of view (FOV) to produce a scanned modulated beam of light 134.

After being reflected (and scanned) by the mirror of MEMS scanner 140, the scanned beam again passes through polarization rotator 120. The polarization rotator may convert the now circularly-polarized beam from the mirror of MEMS scanner 140 to be p-polarized.

For example, light beam 132 may be passed through polarization rotator 120 to cause the polarity of light beam 132 to change. This may allow the light beam to be subsequently passed through selective fold mirror 110 and not be reflected. The mirror of MEMS scanner 140 may receive light beam 132 and reflect it at a modulated frequency in the X and Y directions (or in some embodiments in one direction) along a path substantially parallel to the normal of the mirror of MEMS scanner 140 for external projection. As described in more detail in connection with FIGS. 2 and 4, polarization rotator 120 may be operable to convert p-polarized light to s-polarized light when it is desirable to cause scanned beam 134 to be reflected off of selective fold mirror 110.

The p-polarized light beam may propagate toward selective fold mirror 110. Selective fold mirror 110 may be configured to preferentially pass p-polarized light and thus allows the p-polarized scanned beam 134 to pass toward the FOV. Scanned beam 134 that is passed toward the FOV may be projected on a monitor, screen or any other suitable external display surface.

Figure 2:
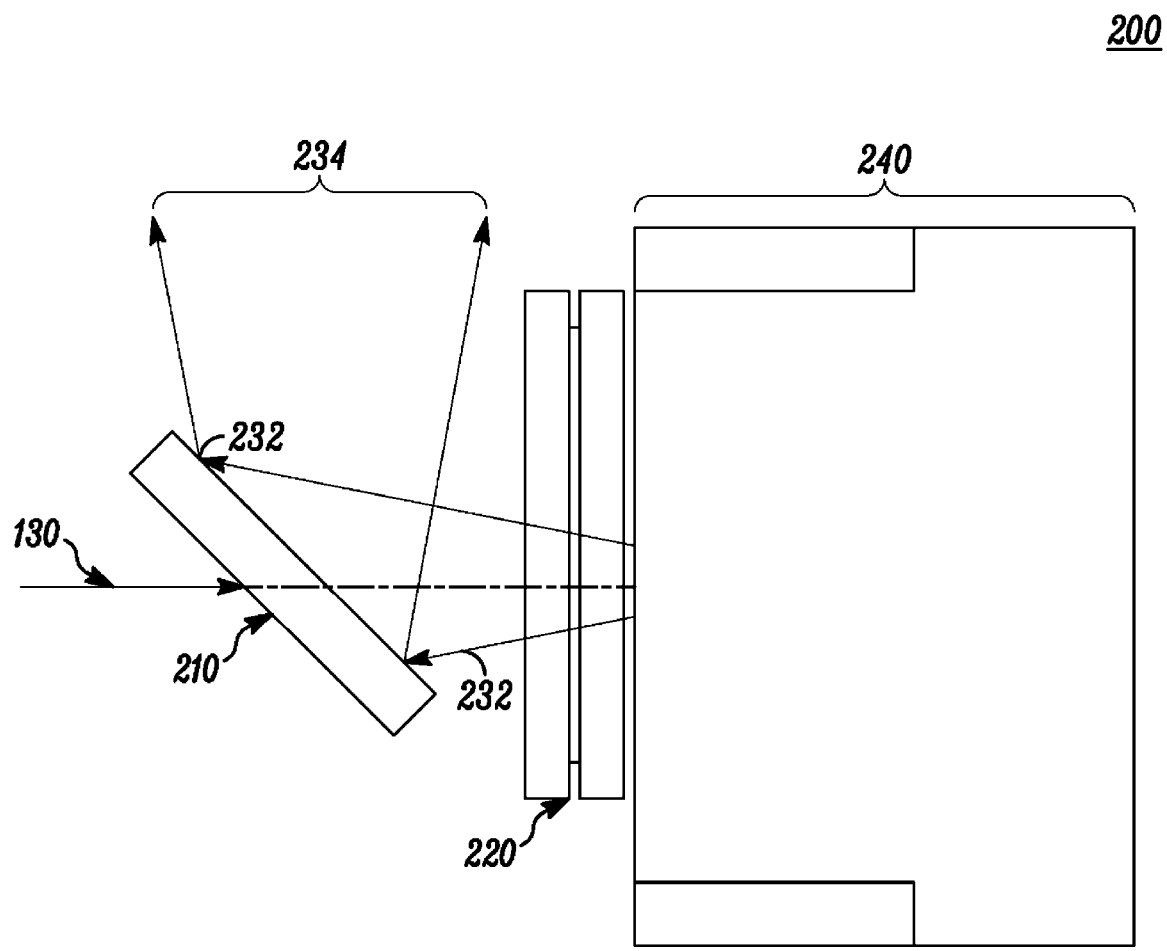
FIG. 2 is a diagram of a MEMS-based projector projecting an input beam using a selective fold mirror in accordance with one or more embodiments.

FIG. 2 shows a MEMS-based projector 200 with a p-polarized input beam propagated substantially parallel to the normal of the mirror of a MEMS scanner. MEMS-based projector 200 may include at least a MEMS scanner 240, a polarization rotator 220, and a selective fold mirror 210. As described above in connection with FIG. 1, modulated composite beam 130 may be generated by light sources 150 and combiner 170 and may be p-polarized.

In accordance with this embodiment, composite beam 130 may travel in a direction substantially parallel to the normal of MEMS scanner 240. The p-polarized light may propagate toward selective fold mirror 210. Selective fold mirror 210 may be configured to preferentially pass p-polarized light and thus allows the p-polarized composite beam 130 to pass toward MEMS scanner 240. Selective fold mirror 210 may be for example a polarizing beam splitter.

Composite beam 130 may pass through a polarization rotator 220 before being scanned by MEMS scanner 240. Polarization rotator 220 may be a quarter wave plate. After passing through polarization rotator 220, composite beam 130 may be circularly polarized. The mirror of MEMS scanner 240 may scan and reflect beam 232 back through polarization rotator 220 changing the beam's polarity to be s-polarized and thereby making the beam unable to pass through selective fold mirror 210.

Selective fold mirror 210 may be configured to reflect s-polarized light. As the reflected beam is propagated back towards selective fold mirror 210, it may be reflected in a second direction for external projection. For example, selective fold mirror 210 may be oriented in a way that causes beam 232 to be reflected at a 90 degree angle from the normal of the mirror of MEMS scanner 240. Thus, the direction of externally projected beam 234 may be substantially perpendicular to the normal of the mirror of MEMS scanner 240.

It should be understood that MEMS scanner 240 or selective fold mirror 210 may be oriented in any direction to change the angle of externally projected beam 234. For example, as the angle between the normal of selective fold mirror 210 and the mirror of MEMS scanner 240 is reduced, the angle between externally projected beam 230 and the normal of the mirror of MEMS scanner 240 also may be reduced. Thus, externally projected beam 234 may if desired be projected towards MEMS scanner 240. Moreover, the angle formed between composite beam 130 and the plane of selective fold mirror 210 may determine the angle formed between composite beam 130 and beam 234. In particular, the angle formed between composite beam 130 and beam 234 may be equal to twice the value of the angle formed between composite beam 130 and the plane of selective fold mirror 210.

Similarly, as the as the angle between the normal of selective fold mirror 210 and the mirror of MEMS scanner 240 is increased, the angle between externally projected beam 230 and the normal of the mirror of MEMS scanner 240 also may be increased.

In accordance with another embodiment of the claimed subject matter, a light beam may be received by a MEMS-based projector. The projector may scan and externally project the beam in a direction substantially parallel to the direction of the received light beam. The received beam may either be s-polarized (FIGS. 3 and 5) or p-polarized (FIG. 4). The received beam may be received in a direction substantially perpendicular to the normal of the mirror of the MEMS scanner.

Figure 3:
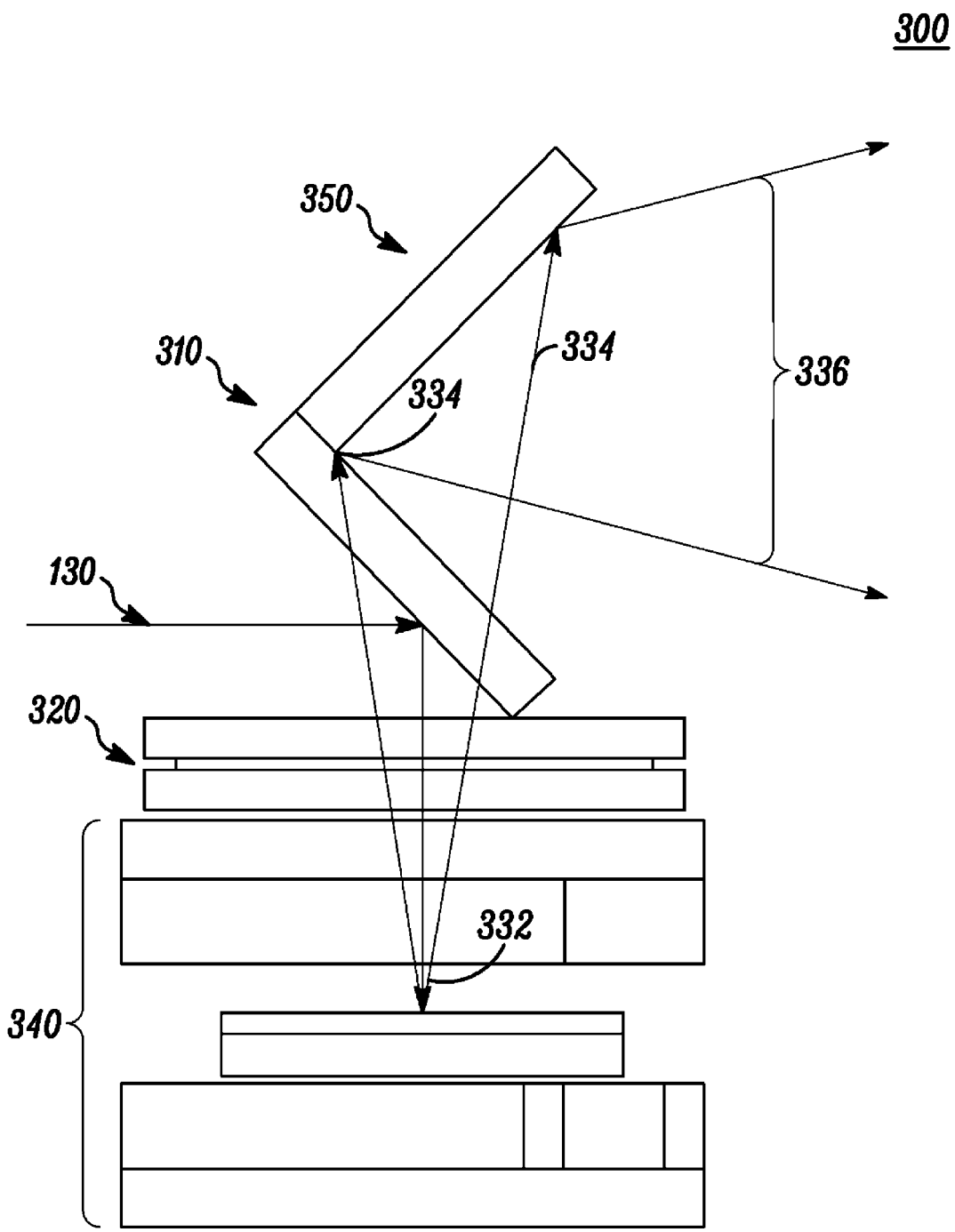
FIG. 3 is a diagram of a MEMS-based projector projecting an input beam using a static mirror and selective fold mirror in accordance with one or more embodiments.
Figure 4:
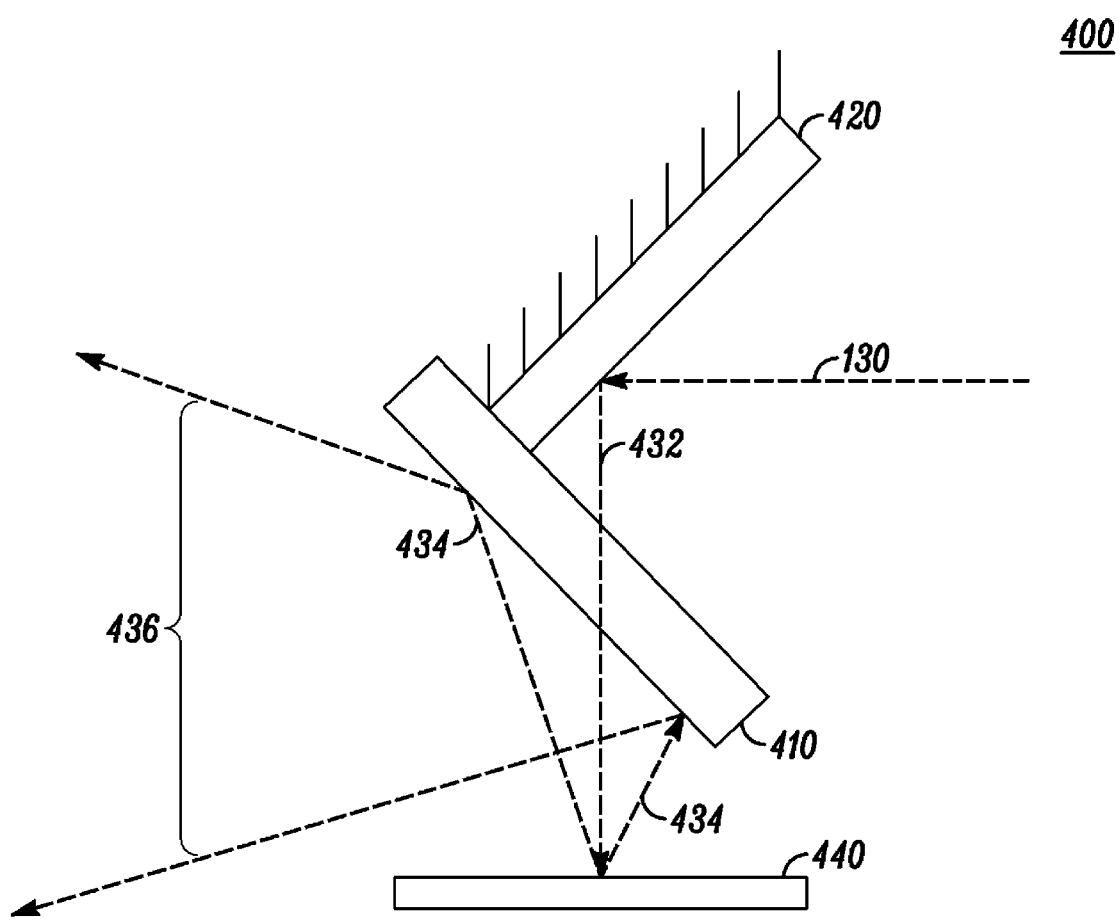
FIG. 4 is a diagram of a MEMS-based projector projecting an input beam using a static mirror and selective fold mirror in accordance with one or more embodiments.

FIG. 3 shows a MEMS-based projector 300 with an s-polarized input beam propagated substantially perpendicular to the normal of the mirror of a MEMS scanner. MEMS-based projector 300 may include at least a MEMS scanner 340, a polarization rotator 320, a polarizing beam splitter 310, and a static mirror 350. The arrangement provided in MEMS-based projector 300 is similar to the one shown in FIG. 1 with the addition of a static mirror (described below).

Composite beam 130 may be s-polarized and propagated in a direction substantially perpendicular to the normal of the mirror of MEMS scanner 340. Polarizing beam splitter 310 may be a polarizing beam splitter and may be configured to reflect s-polarized light and allow p-polarized light to pass through. Composite beam 130 may thereby be reflected off of polarizing beam splitter 310 towards the direction of MEMS scanner 340.

Before the reflected beam 332 is reflected off of the mirror of MEMS scanner 340, reflected beam 332 may be passed through polarization rotator 320. Polarization rotator 320 may be operative to change the polarity of reflected beam 332 from s-polarized to circularly polarized. The mirror of MEMS scanner 340 may reflect the circularly polarized light beam back through polarization rotator 320 towards polarizing beam splitter 310 for external projection. After passing through polarization rotator 320 the beam 334 reflected off of the mirror of MEMS scanner 340 may change its polarity to be p-polarized and may thereby pass through polarizing beam splitter 310.

In FIG. 1 the beam passing through selective fold mirror 110 may be externally projected in a direction substantially perpendicular to composite beam 130. However, as shown in FIG. 3, static mirror 350 may be positioned adjacent or substantially close to polarizing beam splitter 310 at a 90 degree angle (or along the normal of polarizing beam splitter 310) to reflect beam 334 in an alternate direction. For example, the result may be that after p-polarized beam 334 passes through polarizing beam splitter 310 it may be reflected off of static mirror 350 in a direction 90 degrees from beam 334 for external projection. More specifically, the externally projected beam 336 may be in a direction substantially parallel to the composite beam 130 or substantially perpendicular to the beam reflected off of the mirror of MEMS scanner 340.

It should be understood that static mirror 350 may alternatively be oriented or positioned to reflect the beam in any desired angle relative to the normal of the mirror of MEMS scanner 340. For example, static mirror 350 may be oriented along an angle greater than or less than the normal of polarizing beam splitter 310 to reflect externally projected beam 336 at an angle greater than or less than the normal of the mirror of MEMS scanner 340, respectively. For example, the angle formed between the plane of static mirror 350 and a normal of selective fold mirror 310 may determine the angle formed between composite beam 130 and beam 336. In particular, the angle formed between composite beam 130 and beam 336 may be equal to twice the value of the angle formed between the plane of static mirror 350 and the normal of selective fold mirror 310.

FIG. 4 is a diagram of a MEMS-based projector 400 with a p-polarized input beam propagated substantially perpendicular to the normal of the mirror of a MEMS scanner. MEMS-based projector 400 may include at least a MEMS scanner with a polarization rotator 440, a polarizing beam splitter 410, and a static mirror 420.

Composite beam 130 may be received by projector 400. Composite beam 130 may travel in a direction that is substantially perpendicular to the normal of the mirror of MEMS scanner with a polarization rotator 440.

The arrangement shown in projector 400 is similar to that of FIG. 2 except that composite beam 130 is propagated in the direction substantially perpendicular to the normal of the mirror of MEMS scanner with a polarization rotator 440. MEMS scanner with a polarization rotator 440 is represented as the combination of MEMS scanner 240 and polarization rotator 220 (FIG. 2). Static mirror 420 may be provided to change the direction of composite beam 130 to be in the direction substantially parallel to the normal of the mirror of MEMS scanner with a polarization rotator 440.

For example, static mirror 420 may be oriented to reflect composite beam 130 in the direction of selective fold mirror 210 and MEMS scanner with polarization rotator 440. As shown in FIG. 4, static mirror 420 may be positioned adjacent selective fold mirror 210 along the normal of selective fold mirror 210. Since composite beam may be received at a 45 degree angle to one side of the normal of static mirror 420, it may be reflected at a 45 degree angle in the other side of static mirror 420. This may result in composite beam 130 being reflected at a 90 degree angle towards of MEMS scanner with a polarization rotator 440.

It should be understood, that static mirror may be oriented in any other position relative to MEMS scanner with a polarization rotator 440 or polarizing beam splitter 410 to reflect composite beam 130 towards MEMS scanner with a polarization rotator 440. For example, if composite beam 130 is received at an angle larger than 45 degrees from the normal of static mirror 420 that is drawn in FIG. 4, the orientation of static mirror 420 may be changed to compensate for the difference and reflect composite beam 130 towards MEMS scanner with a polarization rotator 440.

Beam 432 may be p-polarized and may therefore pass through polarizing beam splitter 410 after being reflected by static mirror 420. Beam 432 may then change its polarity to s-polarized and be reflected back by MEMS scanner with a polarization rotator 440 towards polarizing beam splitter 410. Because the polarity has changed to s-polarized, the beam 434, reflected from MEMS scanner with a polarization rotator 440, may be reflected by polarizing beam splitter 410 for external projection.

For example, polarizing beam splitter 410 may be oriented to reflect beam 434 and project the reflected beam 436 externally on a screen. Polarizing beam splitter 410 may be oriented in any desired direction. Accordingly, as drawn, reflected beam 436 may be reflected at a 45 degree angle to the normal of polarizing beam splitter 410. More specifically, reflected beam 436 may be substantially perpendicular to the normal of MEMS scanner with a polarization rotator 440 or, in other words, substantially parallel to composite beam 130.

Figure 5:
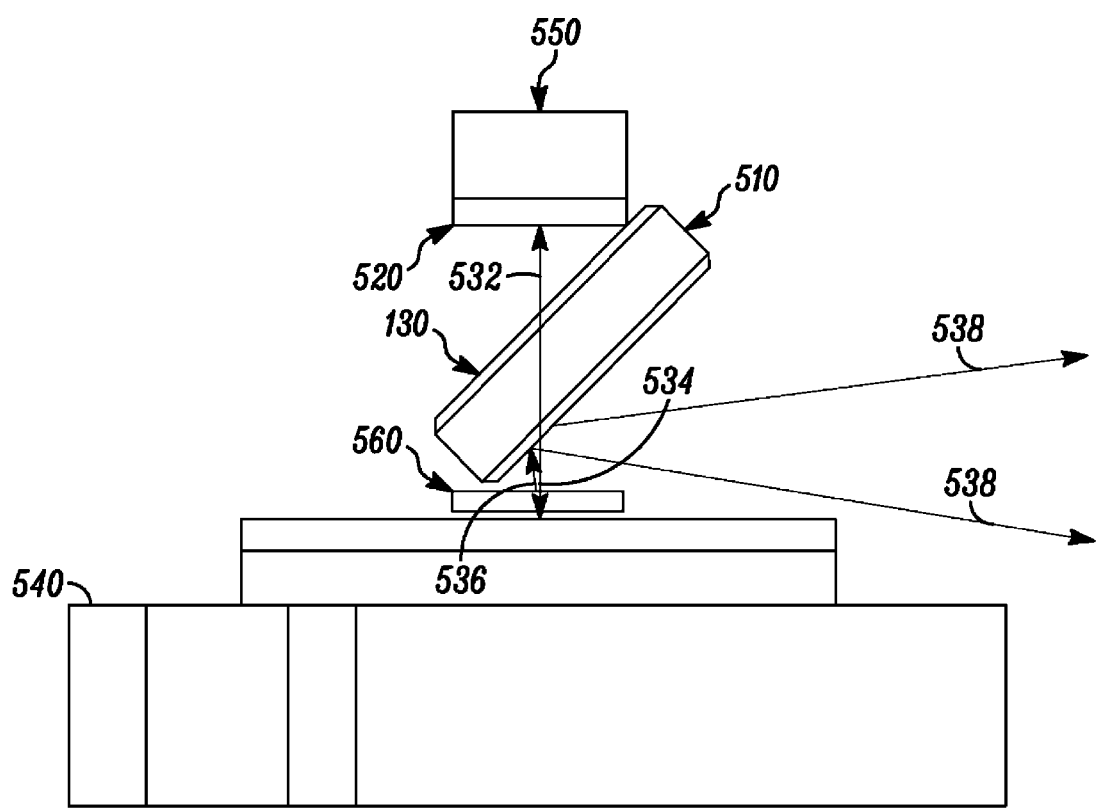
FIG. 5 is a diagram of a MEMS-based projector projecting an input beam using two polarization rotators in accordance with one or more embodiments.

FIG. 5 is a diagram of a MEMS-based projector 500 with an s-polarized input beam propagated substantially perpendicular to the normal of the mirror of a MEMS scanner. MEMS-based projector 500 may include at least a MEMS scanner 540, a first polarization rotator 520, a second polarization rotator 560, a static mirror 550, and a polarizing beam splitter 510.

Composite beam 130 may be s-polarized and may travel in a direction substantially perpendicular to the normal of the mirror of MEMS scanner 540. Selective fold mirror may be oriented in such that may cause the beam striking the selective fold mirror to be reflected away from MEMS scanner 540. Thus, composite beam 130 may be reflected by polarizing beam splitter 510 in a direction away from MEMS scanner 540 substantially parallel to the normal of the mirror of MEMS scanner 540 towards static mirror 550. Static mirror 550 may function to reflect the beam in the opposite direction towards MEMS scanner 540.

The beam 532 reflected by polarizing beam splitter 510 may pass through a first polarization rotator 520 before being reflected by static mirror 550. The beam 534 may be reflected by static mirror 550 in a direction towards MEMS scanner 540. It should be understood that although static mirror 550 and first polarization rotator 520 are drawn directly above and substantially parallel to the normal of MEMS scanner 540, static mirror 550 and first polarization rotator 520 may be positioned and oriented in any direction to receive beam 532 reflected by polarizing beam splitter 510 and reflect beam 532 towards MEMS scanner 540.

Prior to reaching polarizing beam splitter 510, beam 534 may be passed a second time through first polarization rotator 520 to change its polarity to be p-polarized. Beam 534, now p-polarized, may be capable of passing through polarizing beam splitter 510 towards MEMS scanner 540. Beam 534 may pass through second polarization rotator 560 before being reflected by the mirror of MEMS scanner 540.

The mirror of MEMS scanner 540 may reflect beam 536 through second polarization rotator 560 towards polarizing beam splitter 510. Beam 536 now s-polarized may be reflected by polarizing beam splitter 510 to project beam 538 on an external screen. Because the same polarizing beam splitter 510 is used to reflect the input and the output beams, projected beam 538 may travel in a direction substantially parallel to the direction of composite beam 130.

The orientation and position of polarizing beam splitter 510 may be changed to compensate for the orientation of MEMS scanner 540 or the angle of composite beam 130 relative to MEMS scanner 540. For example, because polarizing beam splitter 510 may reflect two beams (composite beam 130 and beam 536 reflected off of the mirror of MEMS scanner 540), changing the orientation of polarizing beam splitter 510 may cause the input beam to be reflected in a different direction as well as the output beam. Therefore, any change in the orientation of polarizing beam splitter 510 may require a change in orientation of static mirror 510 (which may reflect the beam towards MEMS scanner 540) or a change in the orientation of MEMS scanner 540 to receive the beam reflected by static mirror 550.

As described above, depending on the polarity of the light beam, it may either be reflected or passed through a selective fold mirror. The light beam may be reflected towards a MEMS scanner, passed through a polarization rotator, and then projected by passing through or being reflected off of the selective fold mirror.

The light beam in some other embodiments may be received along a first path and regardless of polarity be projected along a second path substantially parallel to the first path without the need for a selective fold mirror or a polarization rotator. As described below in connection with FIG. 6, two static mirrors may be used to reflect the beam (regardless of polarity) in the desired directions towards a MEMS scanner and for external projection without the use of polarization rotator or a selective fold mirror. Alternatively, as described in connection with FIGS. 7 and 8, one or two total internal reflection prisms may be used to reflect the beam in the desired directions towards a MEMS scanner and for external projection without the use of polarization rotator or a selective fold mirror. However, in FIG. 7 a polarization reflective coating may be placed on the surface of the prism to provide reflection. This will be described in more detail in connection with FIG. 7.

Figure 6:
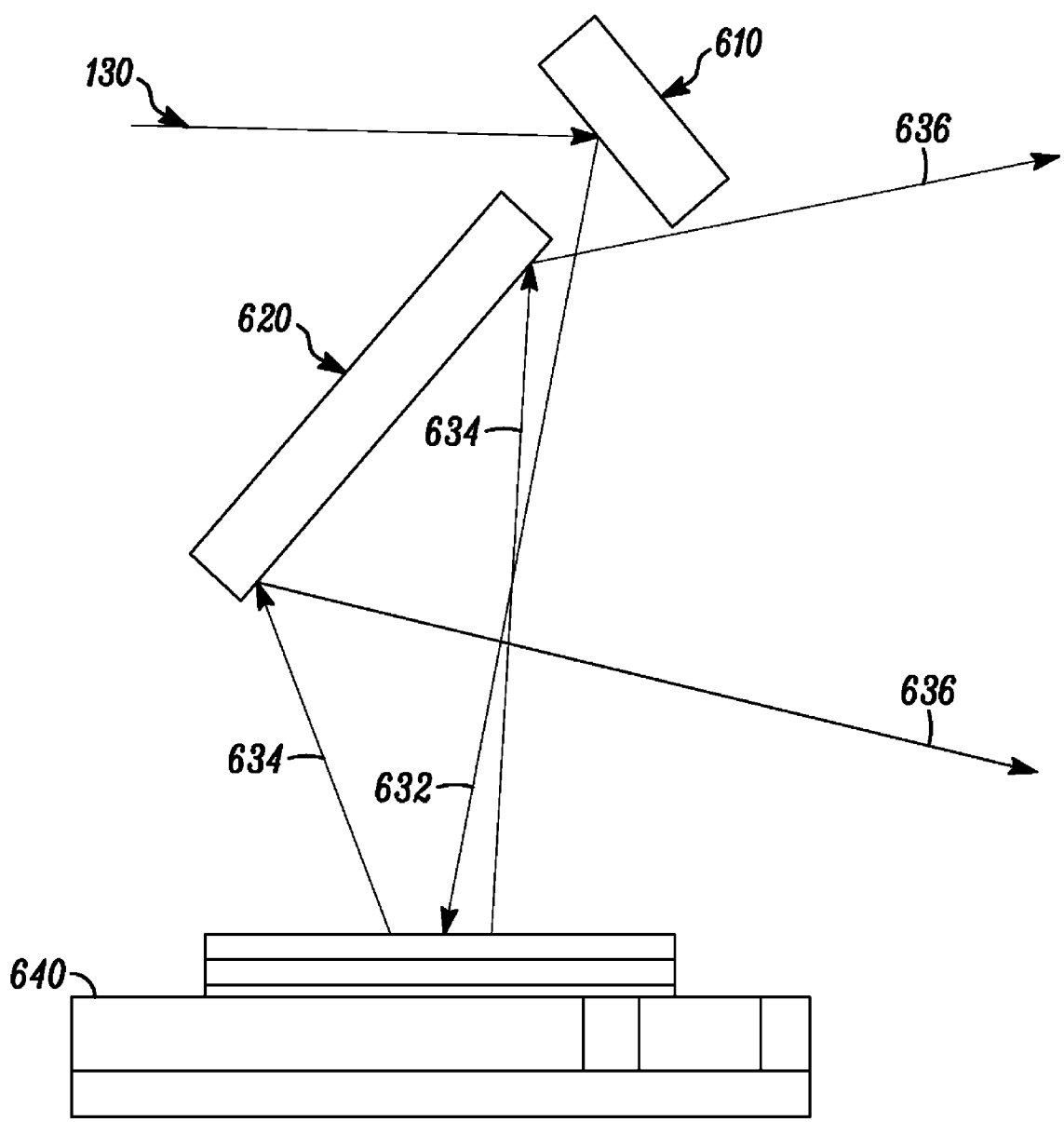
FIG. 6 is a diagram of a MEMS-based projector projecting an input beam using two static mirrors in accordance with one or more embodiments.

FIG. 6 is a diagram of a MEMS-based projector 600 with an input beam propagated substantially perpendicular to the normal of the mirror of a MEMS scanner. MEMS-based projector 600 may include at least a MEMS scanner 640, a first static mirror 610, and a second static mirror 620.

Composite beam 130 may be s-polarized, p-polarized, circularly polarized, or have any other type of polarization. Composite beam 130 may be reflected off of static mirror 610 towards MEMS scanner 640. Static mirror 610 may be oriented or positioned in a way that reflects composite beam 130 towards MEMS scanner.

The reflected beam 632 may be received by MEMS scanner 640 and reflected towards second static mirror 620. The position and orientation of second static mirror 620 is such that it does not interfere with reflected beam 632. In particular, second mirror 620 may be oriented to allow reflected beam 632 to be scanned by MEMS scanner 640 while retaining an orientation that may receive the reflected beam 634 off of the mirror of MEMS scanner 640.

Second static mirror 620 may be oriented to reflect beam 634 from MEMS scanner 640 for external projection. Depending on its orientation and position, second static mirror 620 may project beam 636 in a direction substantially parallel to composite beam 130.

It should be understood that although two static mirrors are shown and described in connection with FIG. 6, one or both mirrors may be replaced by a selective fold mirror such as polarizing beam splitter in the case that composite beam 130 is s-polarized. In such a scenario, composite beam 130 may be reflected by either or both selective fold mirrors and thereby either or both selective fold mirrors provide the same behavior as static mirrors 610 and 620.

Figure 7:
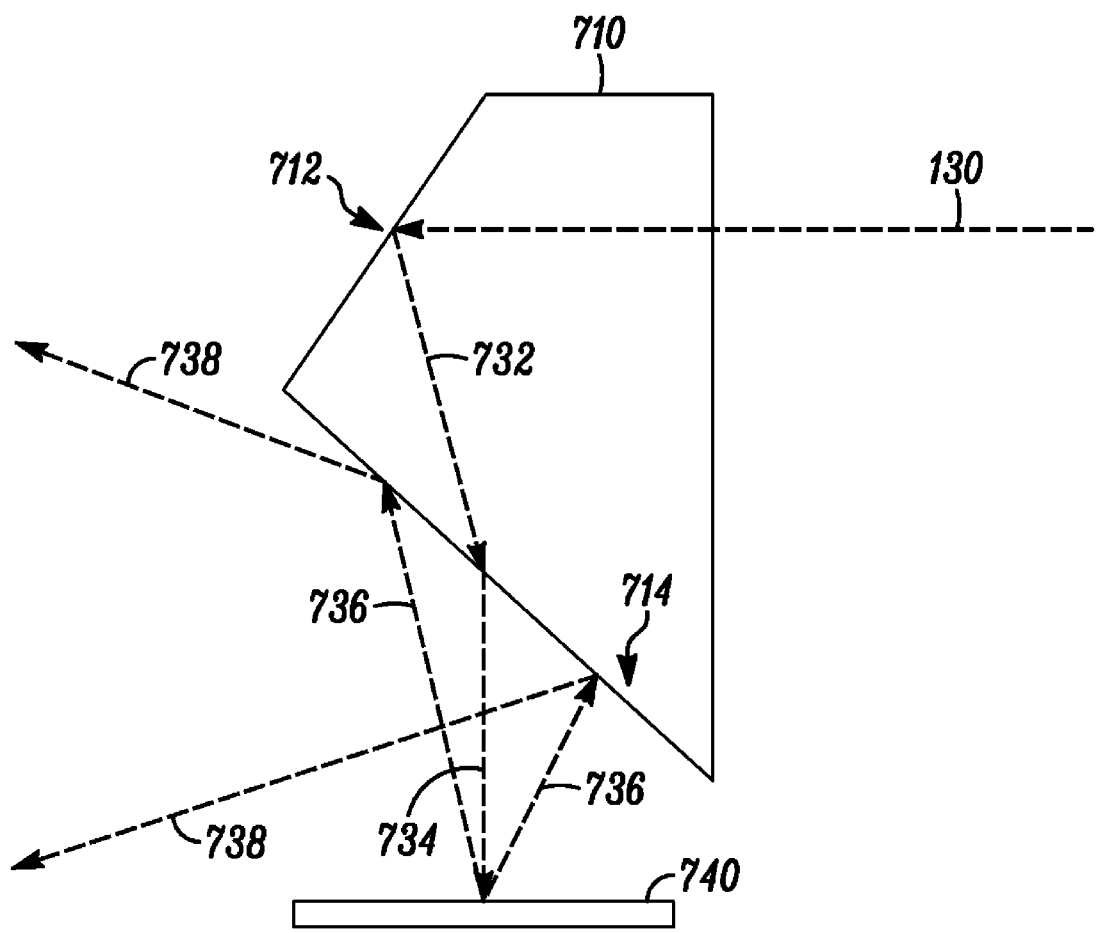
FIG. 7 is a diagram of a MEMS-based projector projecting an input beam using one prism in accordance with one or more embodiments.

FIG. 7 is a diagram of a MEMS-based projector 700 with a p-polarized input beam propagated substantially perpendicular to the normal of the mirror of a MEMS scanner. MEMS-based projector 700 may include at least a MEMS scanner with a polarization rotator 740 and a total internal reflection prism 710.

Composite beam 130 may be s-polarized and may be propagated along a direction that is substantially perpendicular to an outside surface of prism 710. Alternatively, composite beam 130 may be propagated along any direction that will pass through the first outside surface of prism 710.

Once composite beam 130 passes through the first outside surface of prism 710, it may be internally reflected by a first inside surface 712 of prism 710. The reflection inside of prism 710 may be caused when the angle of the beam, relative to the normal of the target surface of the prism, is greater than the critical angle. When it is less than the critical angle (i.e., the beam is closer to the normal of the target surface) the beam may refract and exit the prism. Accordingly, prism 710 may be oriented such that when composite beam 130 strikes surface 712 of prism 710, it is reflected towards MEMS scanner 740.

The internally reflected beam 732 may strike a second internal surface 714 of prism 710 that may be coated with a polarization reflective coating. Because the beam may be p-polarized it may pass through the coated surface, refract and exit the prism. The refracted beam 734 may be propagated in the direction of MEMS scanner with polarization rotator 740. Refracted beam 734 may pass through MEMS scanner with polarization rotator 740 change its polarity to be s-polarized and be reflected as beam 736 back towards prism 710.

Beam 736 may strike the outside of second surface 714. The outside of second surface 714 coated with a polarization reflective coating may cause s-polarized beam 736 to be reflected when it strikes the surface of prism 710. This coating may be necessary because the beam reflected by MEMS scanner 740 may strike the surface of the prism at an angle that may be less than the critical angle and would otherwise pass through the prism. Projected beam 738 may be reflected by surface 714 and externally projected on a screen in a direction substantially parallel to the direction of composite beam 130.

The orientation of prism 710 is critical as any change in position or orientation may cause one of the beams to be either reflected or refracted in an undesirable manner.

Figure 8:
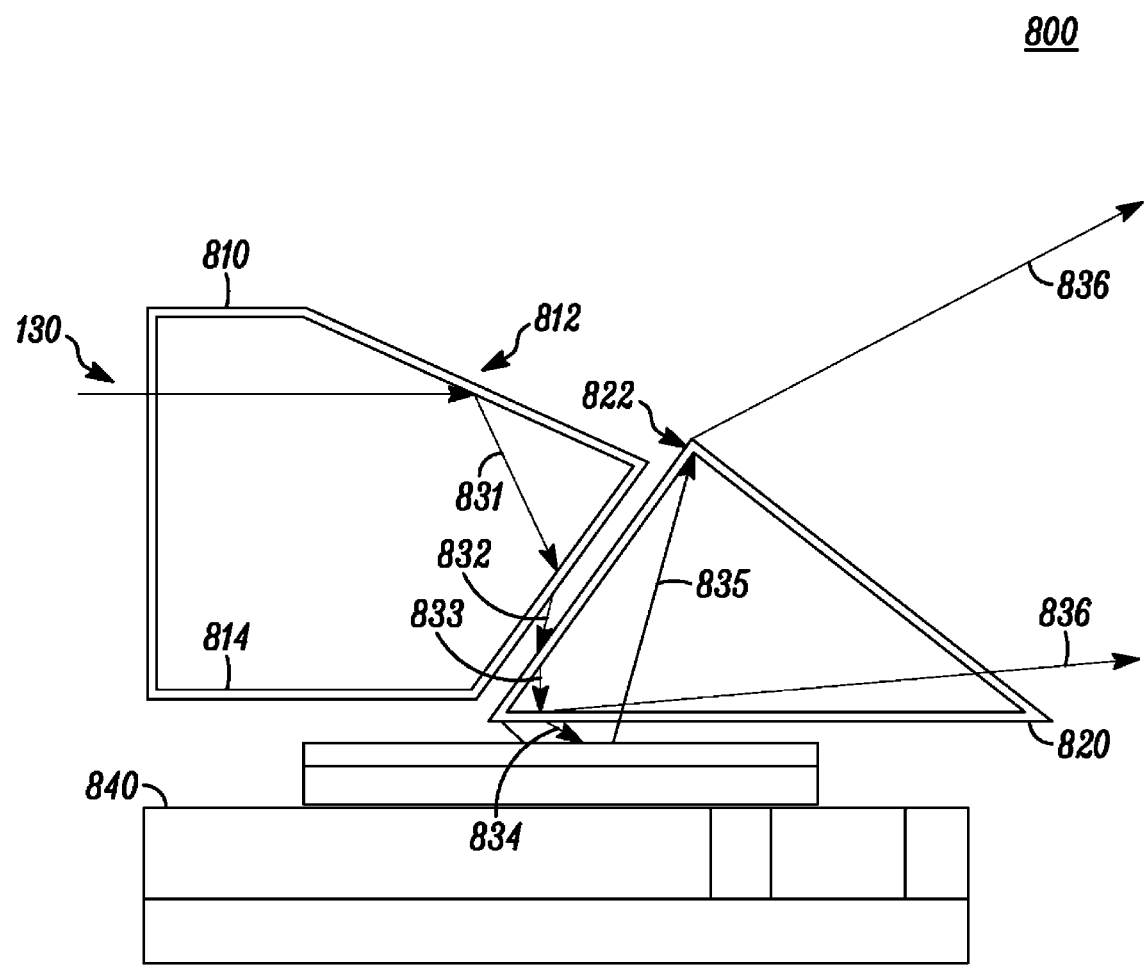
FIG. 8 is a diagram of a MEMS-based projector projecting an input beam using two prisms in accordance with one or more embodiments.

FIG. 8 is a diagram of a MEMS-based projector 800 with an input beam propagated substantially perpendicular to the normal of the mirror of a MEMS scanner. MEMS-based projector 800 may include at least a MEMS scanner 840, a first total internal reflection prism 810, and a second total internal reflection prism 820.

First total internal reflection prism 810 provides similar behavior as prism 710 (FIG. 7). For example, composite beam 130 may be reflected by a first internal surface 812. The reflected beam 831 may be refracted by a second internal surface 814 and exit prism 810 towards MEMS scanner 840.

Second total internal reflection prism 820 may be provided to correct or align the beam exiting first prism 810 and the beam reflected off of the mirror of MEMS scanner 840. For example, the beam 832 refracted by second internal surface 814 may be propagated in a direction that may not substantially approach MEMS scanner 840. Second prism 820 may be positioned and oriented in the path of beam 832 to correct or align the direction of the beam towards MEMS scanner 840.

Beam 832 may strike a first outside surface 822 of second prism 820 and refract internally. The internally refracted beam 833 may strike a second surface of second prism 820 and be further refracted towards MEMS scanner 840. Thus the direction of beam 832 exiting first prism 810 may be corrected or aligned towards MEMS scanner 840.

Second prism 820 may also obviate the need for the polarization reflective coating described above in connection with FIG. 7. More specifically, because the beam reflected by MEMS scanner 840 may strike the surface of second prism 820 at an angle that naturally reflects (i.e., greater than the critical angle), there is no need for a reflective coating.

The beam 834 exiting second prism 820 may be scanned and reflected back towards second prism 820 by MEMS scanner 840. Beam 835 may be reflected by the mirror of MEMS scanner 840 towards second prism 820. Beam 835 may pass through the second surface of second prism 820 and strike the internal surface of first surface 822 of second prism 820 at or beyond the critical angle causing reflection. Internal surface 822 of second prism 820 may thereby reflect beam 835 and may externally project beam 836 along a direction substantially parallel to the path of composite beam 130.

Thus it has been shown how a prism may be oriented to refract and reflect a beam towards a MEMS scanner and reflect the beam for external projection. Also, a second prism may be used to correct or align a beam towards the MEMS scanner and change the direction of the externally projected beam. A second prism may also obviate the need for a polarization reflective coating. Thus, a polarization rotator that may otherwise be necessary if the beam reflected by a MEMS scanner is below the critical angle allowing the beam to pass through may also be obviated. Further, using a second prism allows any type of polarized or non-polarized light beam to be refracted/reflected towards the MEMS scanner and the beam reflected from the MEMS scanner to be reflected for external projection.

An optical component (described in more detail below in connection with FIGS. 9-11) may be used to provide a number of functions that would otherwise require multiple different components. Using the optical component may reduce the size of the MEMS-based projector and may enable the projector to be placed in a small form-factor user device. The functions that the optical component may provide include reflecting a light beam towards a MEMS scanner and receiving the light beam from the MEMS scanner for external projection, reducing the height of the scanned projection cone (e.g., projection angle), providing a protective window to prevent the MEMS-based projector from exposure to dust and moisture in the external environment, optical and chromatic aberration correction and steering the externally projected light beam along the horizontal or vertical direction.

Figure 9:
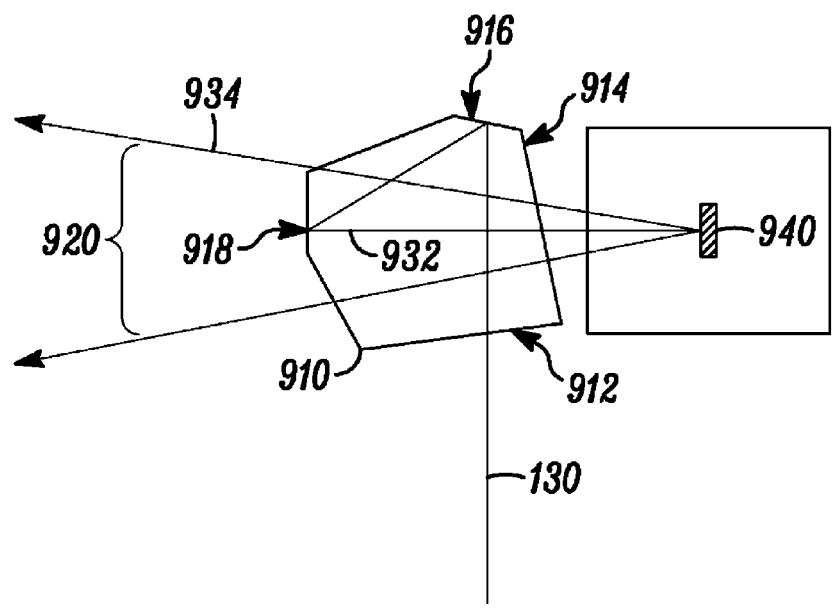
FIG. 9 is a top plan view of a MEMS-based projector projecting an input beam using an optical component in accordance with one or more embodiments.
Figure 10:
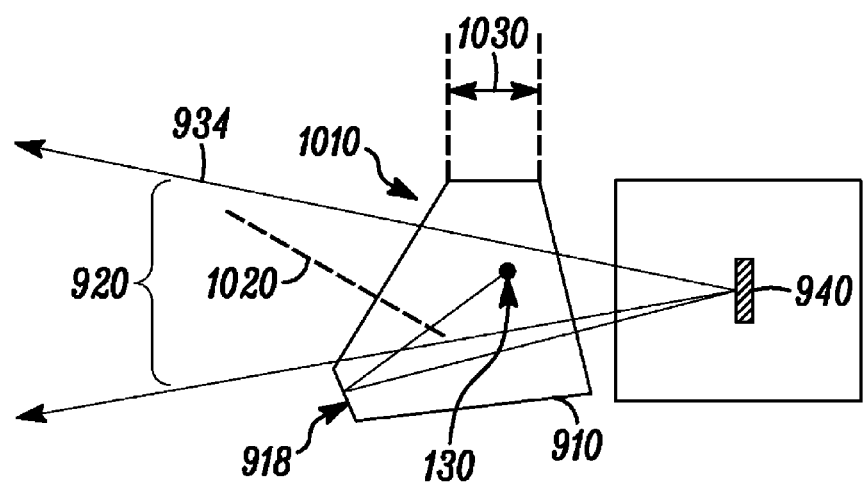
FIG. 10 is a side elevation view of a MEMS-based projector projecting an input beam using an optical component in accordance with one or more embodiments.

FIGS. 9 and 10 are top plan and side elevation views, respectively, of a MEMS-based projector projecting input beam 130 using an optical component 910 in accordance with an embodiment of the claimed subject matter. Input beam 130 may enter the optical component incident a first side 912. The light beam 932 may be internally reflected off of sides 916 and/or 918 towards MEMS scanner 940. For example, optical component 910 may have similar functionality as total internal reflection prisms shown and described in connection with FIGS. 7 and 8. Thus, a single component such as optical component 910 may provide the function of reflecting or redirecting an input beam towards a MEMS scanner. This may reduce the number of components necessary to redirect a light beam to various portions of a MEMS-based projector.

In some embodiments, at least one of the surfaces of optical component 910 may be partially translucent or not be totally reflective. This may allow the light beam to be partially passed through the surface and be read by a photodiode (not shown) that may be placed behind the partially translucent surface. The photodiode may be used to read an intensity or color value of a particular laser beam or pixel that is projected onto the screen. The photodiode may be used to compare what the color or intensity of the pixel should be versus what it actually is on the screen. Thus, chromatic aberrations (discussed in more detail below) may be detected and corrected by optical component 910 and various software algorithms.

Depending on the shape of optical component 910 (e.g., the angles formed by each of sides 916 and 918), the light beam may be redirected/reflected in various directions. For example, because optical component 910 is a 3D object, the light beam may be reflected within optical component 910 along different planes and axes. In particular, light beam 130 may enter optical component 910 traveling along a first plane and may be internally reflected towards MEMS scanner 940 which may be in a second plane that may be at a distance in the X or Y axis away from the first plane. For example, as shown in FIG. 9, light beam 130 may enter optical component 910 traveling along a first plane and may strike surface 916. Surface 916 may be angled such that it reflects the light beam towards the bottom of optical component 910 or towards surface 918. As shown in the side view of optical component 910 (FIG. 10), the light beam may be reflected towards the bottom of optical component 910 and may strike surface 918. The light beam 932 may be reflected off of surface 918 towards MEMS scanner 940 which may be in a second plane at a distance in the X or Y direction from the first plane.

Referring back to FIG. 9, MEMS scanner 940 may reflect the light beam 934 back towards optical component 914 for external projection along a projection cone. Light beam 934 may pass through and be refracted by optical component 912 prior to being externally projected on a screen. MEMS scanner 940 may reflect the beam in the X and Y axes. The scanned projection cone 920 is the distance between the two boundaries along the X axis or the two boundaries along the Y axis of light beam 934.

Optical component 910 may include an optical slab which has a thickness 1030 (FIG. 10) and an index which may reduce the height of scanned projection cone 920 by refracting light beam 934 received from MEMS scanner 940 internally. In particular, light beam 934 may enter optical component 910 traveling along a first path and angle and be refracted by optical component 910. The light beam may exit the optical component 910 along a second path at an angle relative to the normal of optical component 910 that is equal to the value of the angle of the light beam entering optical component 910. The first and second paths may be separated by a distance which may be function of the thickness or index of the slab. This functionality will be described in more detail in connection with FIG. 11.

The height of the MEMS-based projector may be reduced by the reduction in height of scanned projection cone 920. For example, as scanned projection cone 920 becomes smaller, the height of the MEMS-based projector also becomes smaller. Thus, because the height of scanned projection cone 920 is a function of the thickness or index of the slab, so is the height of the MEMS-based projector. In some embodiments, the height of the MEMS-based projector becomes smaller as the thickness or index of the slab is increased.

Figure 11:
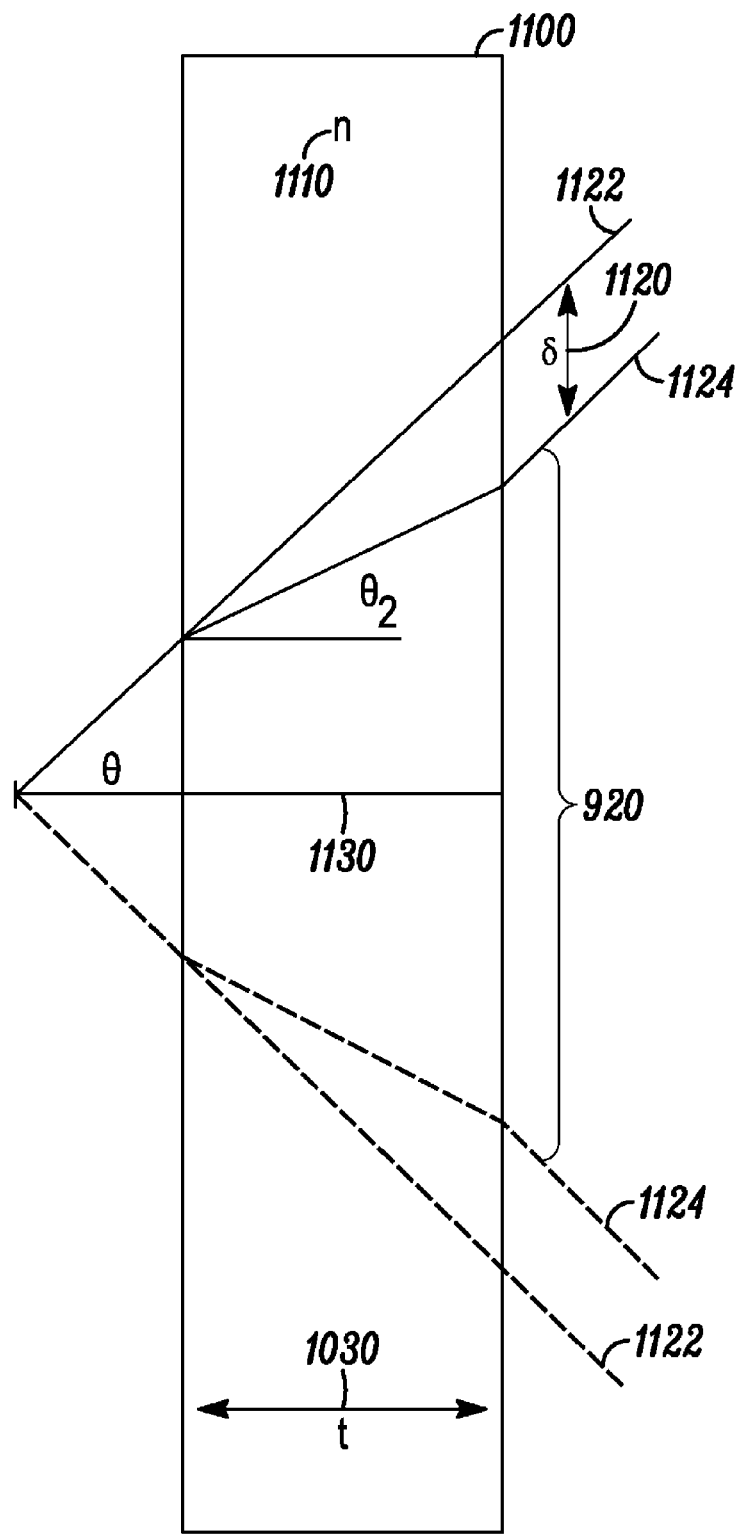
FIG. 11 is a diagram of an optical slab component reducing the height of the scanned projection cone in accordance with one or more embodiments.

FIG. 11 shows an optical slab component 1100 reducing the height of scanned projection cone 920 in accordance with an embodiment of the claimed subject matter. Optical slab component 1100 has a particular index 1110 ($n$) and thickness 1030 ($t$). The height of scanned projection cone 920 is a function of index 1110 and thickness 1030. As shown in FIG. 11, the light beam 1122 enters optical slab component 1100 at an angle $\theta$ relative to the normal 1130 of optical slab component 1100. Light beam 1122 is refracted within slab component 1100 to be an angle $\theta 2$ relative to normal 1130. The light beam 1124 refracts once again when it exits slab component 1130. In refracting again light beam 1124 travels along a second path at the same angle $\theta$ as light beam 1122. However, because of the internal refraction, light beam 1124 is shifted an amount 1120 ($\delta$) from where light beam 1122 would have exited absent slab component 1100. Thus, the same image may be projected on the screen with a smaller scanned projection cone 920 which allows the height of the user device to be reduced.

It should be understood that the portion of light beam 1122 shown exiting slab component 1100 is only illustrative of what the scanned projection cone would be absent the properties of slab component 1100. Light beam 1124, on the other hand, is generated by the refraction of light beam 1122 and exits slab component 1100 and is externally projected on a screen. In particular, as shown, the scanned projection cone that would be produced by light beam 1122 absent slab component 1100, is reduced amount 1120 by slab component 1100 to produce scanned projection cone 920 (e.g., the projection cone of light beam 1124).

It should be understood that slab component 1100, shown in FIG. 11, is an exemplary representation of the properties and behaviors provided by optical component 910. In particular, optical component 910 may change a light beam or scanned projection cone in a similar manner as that which is described above in connection slab component 1100 by changing thickness 1030 of optical component 910 or the index value of optical component 910 (e.g., the material used to manufacture optical component 910).

Amount 1120 ($\delta$) by which scanned projection cone 920 is reduced may be determined with the following functions or equations:

$$\delta = t*[\tan(\theta_2) - \tan(\theta)] \quad (1)$$

$$\theta_2 = a\sin[\sin(\theta)/n] \quad (2)$$

Functions (1) and (2) demonstrate that amount 1120 ($\delta$) may be increased (which reduces the height of scanned projection cone 920) as index 1110 ($n$) or thickness 1030 ($t$) increases. In particular, as index 1110 ($n$) or thickness 1030 ($t$) increases, angle $\theta 2$ at which light beam 1122 is refracted also increases. As light beam 1124 exits slab component 1100 and is again refracted to retain the initial angle $\theta$ of light beam 1122, amount 1120 representing the distance between light beam 1122 and light beam 1124 is increased.

For example, the relationship between thickness 1030 ($t$) and amount 1120 ($\delta$) for a slab component with an index n=1.5 and a light beam with initial angle=21.6 degrees is demonstrated below in exemplary Table 1:

TABLE 1

| t (mm) | $\delta$ (mm) |
|--------|---------------|
| 2      | 0.3           |
| 4      | 0.6           |
| 6      | 0.9           |
| 8      | 1.1           |
| 10     | 1.4           |
| 12     | 1.7           |
| 14     | 2.0           |
| 16     | 2.3           |
| 18     | 2.6           |
| 20     | 2.9           |

The reduction in the size of scanned projection cone 920 may cause optical aberrations in the projected image. Additionally, optical aberrations may exist in input beam 130. Optical component 910 may include curved or tilted surfaces to correct for optical aberrations. For example, referring back to FIG. 10, surface 1010 may be curved in order to correct optical aberrations in the externally projected image. Curving a surface which light passes through causes the surfaces to act as a focusing mechanism.

In particular, a light beam which, because of for example, refraction, strikes the display screen at a point which may be too far to the left or right of where the pixel is to be situated may be focused or repositioned at a different location on the screen by a curved surface. That is, the curved surface may cause a light beam that strikes the surface at a particular angle at a particular point to be passed through at a different angle and thereby be repositioned on the screen. Every point on the curved surface may pass through the light beam at a different angle.

Additionally, a tilted surface may also reposition the projected beam. However, unlike a curved surface, the changed angle at which the beam exits the tilted surface is the same at every point at which the light beam strikes the tilted surface. Thus, the optical aberration caused by the index or thickness of optical component 910 may be corrected by manufacturing a particular surface of the component with a tilt or curve that compensates for the optical aberration.

Optical component 910 may also cause chromatic aberration in where particular set of pixels does not meet the desired color characteristics or intensity. Traditionally, a number of components would be required to change the colors or intensities of the set of pixels which may increase the size of the projector and user device. However, in some embodiments, chromatic aberration may be corrected electronically or in software by an electronic control mechanism.

For example, the electronic control mechanism may read from the display screen a number of pixels projected by the light beam. The errors in color may be measured and compared to the desired color or intensity. The control mechanism may then adjust or calibrate the placement of the pixels on the screen for each color to reduce the chromatic aberration. One way the control mechanism may adjust the placement of the pixels may be by changing the color or intensity of the light beam that corresponds to a particular pixel or set of pixels.

Externally projected light beam 934 may be steered in the vertical or horizontal direction by surface 1010 (FIG. 10) acting as an optical wedge. For example, surface 1010 may be oriented to receive light beam 934 and either pass through the light beam or reflect it in another direction. In particular, surface 1010 may be oriented back towards MEMS scanner 940 which may cause the angle formed between the light beam reflected by MEMS scanner 940 and the normal 1020 of surface 1010 to be increased. In some embodiments, the resulting angle may cause surface 1010 to act as a reflective surface and thereby reflect light beam 934 down in the vertical direction and back in the direction of MEMS scanner 940. This may cause the image to be reversed and projected at an angle pointing down.

Alternatively, surface 1010 may be coated with a reflective coating. Such a reflective coating may cause surface 1010 to reflect light beam 934 in the vertical or horizontal direction (thus changing the location of the projected image on the screen) depending on the angle formed between the light reflected off of MEMS scanner 940 and normal 1020. In some embodiments, the angle formed between the light beam reflected off of MEMS scanner 940 and externally projected light beam 934 may be equal to twice the value of the angle formed between the light beam reflected off of MEMS scanner 940 and normal 1020.

Optical component 910 may be manufactured from glass or plastic. It may be desirable to use a high index material in order to reduce the height of scanned projection cone 920. In particular, in some embodiments, thickness 1030 may be reduced while maintaining a small scanned projection cone if a higher index material is used. Reducing the thickness of optical component 910 may reduce the amount of space required by the projector in the device and thereby may reduce the size of the device. Additionally, a plastic component can be created by injection molding which makes complex shapes easier to manufacture at a reduced cost.

Optical component 910 may also be manufactured with a mounting mechanism. The mounting mechanism may ease the placement of optical component 910 in the MEMS-based projector. For example, optical component 910 may be manufactured with a particular groove that fits onto a position in the projector or user device. Alternatively, optical component may be manufactured with a screw extension to allow the component to be screwed onto the MEMS-based projector or user device.

In some embodiments, optical component 910 may be manufactured to form a tight seal with the user device in which the MEMS-based projector is placed. Forming a tight seal with the user device may prevent fragile projector components from getting damages by the external environment. For example, the external environment may have dust and moisture. By preventing the projector components from exposure to dust and/or moisture the projector may be more durable. Traditionally, additional components such as glass/plastic windows or covers were necessary to prevent such exposure which increased the size of the projector or user device. Because optical component 910 serves multiple functions including preventing such exposures, less components may be required for the operation of the projector and thus the size of the projector and user device may be decreased.

The light source may alternatively be located underneath or above the MEMS scanner. In such a scenario, it may be necessary to reflect the beam in the vertical direction towards the MEMS scanner off of a reflective surface. The reflective surface may consequently also be positioned above or below the MEMS scanner.

Figure 12:
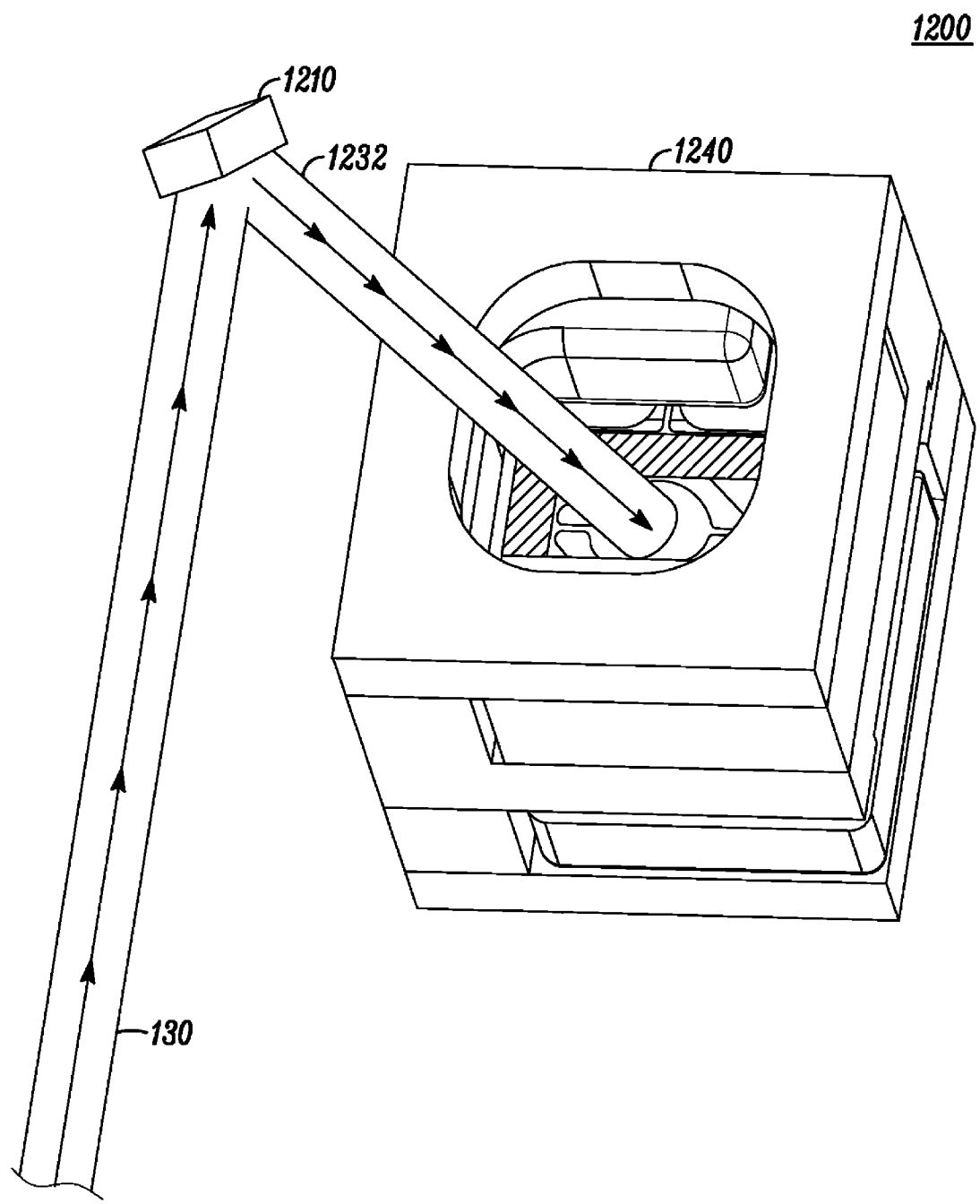
FIG. 12 is a 3D diagram of a MEMS-based projector projecting an input beam using a reflective surface in accordance with one or more embodiments.

FIG. 12 is a 3D diagram of a MEMS-based projector 1200 projecting an input beam using a reflective surface that is positioned above the MEMS scanner in the vertical direction. MEMS-based projector 1200 may include at least a MEMS scanner 1240 and a reflective surface 1210. It should be understood that reflective surface 1210 may be a static mirror, a total internal reflection prism, a selective fold mirror, or any other surface that may cause light beam 130 to be reflected.

MEMS scanner 1240 may be positioned along a first plane oriented in a first direction of a first dimension. Reflective surface 1210 may be positioned along a second plane oriented in a second direction of the first dimension. As shown in FIG. 12, reflective surface 1210 may be offset in the vertical direction relative to MEMS scanner 1240. In particular, reflective surface 1210 may be spatially separated from MEMS scanner 1240 in a second dimension.

The second direction in which the plane of reflective surface 1210 may be oriented such that light beam 130 reflects towards MEMS scanner 1240 along the second dimension. It should be understood that reflective surface 1210 may also be offset in the first dimension relative to MEMS scanner 1240. In particular, reflective surface 1210 may be positioned in a place other than directly above the mirror of MEMS scanner 1240. In such a scenario, reflective surface 1210 may additionally be tilted towards the mirror of MEMS scanner 1240. This may cause reflected beam 1232 to be reflected along the first and the second dimensions.

A total internal reflection prism may be used to provide the functions of reflective surface 1210. The total internal reflection prism may be positioned at a location close to MEMS scanner 1240. Light beam 130 may enter the prism incident to a first boundary surface, be internally reflected off of a second boundary surface, get refracted by a third boundary surface and exit the prism towards MEMS scanner 1240.

The total internal reflection prism may be positioned such that the beam exits the prism towards MEMS scanner 1240 at a different angle than the light beam that is reflected by MEMS scanner 1240. In particular, the light beam reflected by MEMS scanner 1240 may enter the prism incident the third boundary surface at a different angle than the beam exiting the prism from the third boundary surface. Thus the same prism may be used to reflect the beam towards MEMS scanner 1240 and externally project the beam reflected by MEMS scanner 1240.

Figure 13:
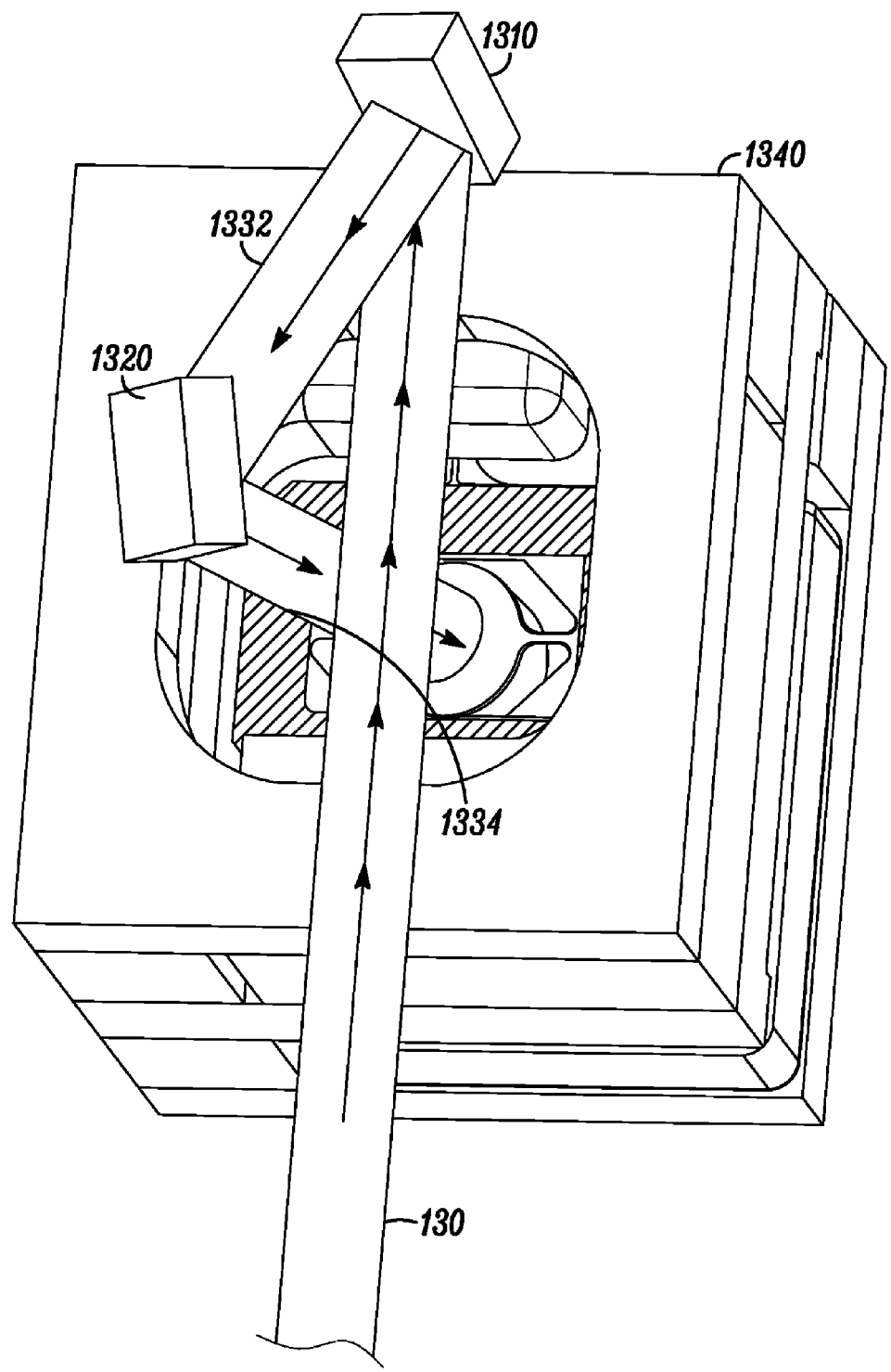
FIG. 13 is a 3D diagram of a MEMS-based projector projecting an input beam using two reflective surfaces in accordance with one or more embodiments.

FIG. 13 is a 3D diagram of a MEMS-based projector 1300 projecting an input beam using two reflective surfaces positioned above the MEMS scanner in the vertical directions. MEMS-based projector 1300 may include at least MEMS scanner 1340, a first reflective surface 1320 and a second reflective surface 1310.

MEMS-based projector 1300 is similar to the MEMS-based projector described in connection with FIG. 12 with the addition of a second reflective surface that reflects a light beam towards the first reflective surface. MEMS scanner 1340 may be positioned along a first plane oriented in a first direction in a first dimension, first reflective surface 1320 may be positioned along a second plane oriented in a second direction in the first dimension, second reflective surface 1310 may be positioned along a third plane oriented in a third direction of the first dimension. The first, second and third planes may be spatially separated along the first and the second dimensions. For example, second reflective surface 1310 may be positioned in the vertical direction between MEMS scanner 1340 and first reflective surface 1320.

Second reflective surface 1310 may receive light beam 130 and reflect the beam 1332 towards first reflective surface 1320. Second reflective surface 1310 may be positioned underneath first reflective surface 1320. Second reflective surface 1310 may therefore be oriented to reflect the beam along the second dimension upwards towards first reflective surface 1320. First and second reflective surfaces 1320 and 1310 may also be spatially separated along the first dimension. Thus, second reflective surface 1310 may also be tilted to reflect the beam along the first dimension as well as the second dimension towards first reflective surface 1320.

As described above in connection with FIG. 12, first reflective surface 1320 may receive beam 1332 and reflect the beam 1334 towards MEMS scanner 1340. MEMS scanner 1340 may reflect the beam for external projection along the first and second dimensions between first and second reflective surfaces 1310 and 1320.

As stated above in connection with FIG. 12, it should be understood that the functions of first and second reflective surfaces 1320 and 1310 may be performed by static mirrors, total internal reflection prisms, selective fold mirrors, or any other surfaces that may cause light beam 130 to be reflected. It should also be understood that the functions of the first and second reflective surfaces may be performed by different combinations of static mirrors, total internal reflection prisms, selective fold mirrors, or any other surfaces that may cause light beam 130 to be reflected. For example, first reflective surface 1310 may be a static mirror while second reflective surface 1320 may be a total internal reflection prism. It should also be understood that the functions of the first and second reflective surfaces may be performed by a single total internal reflection prism.

Figure 14:
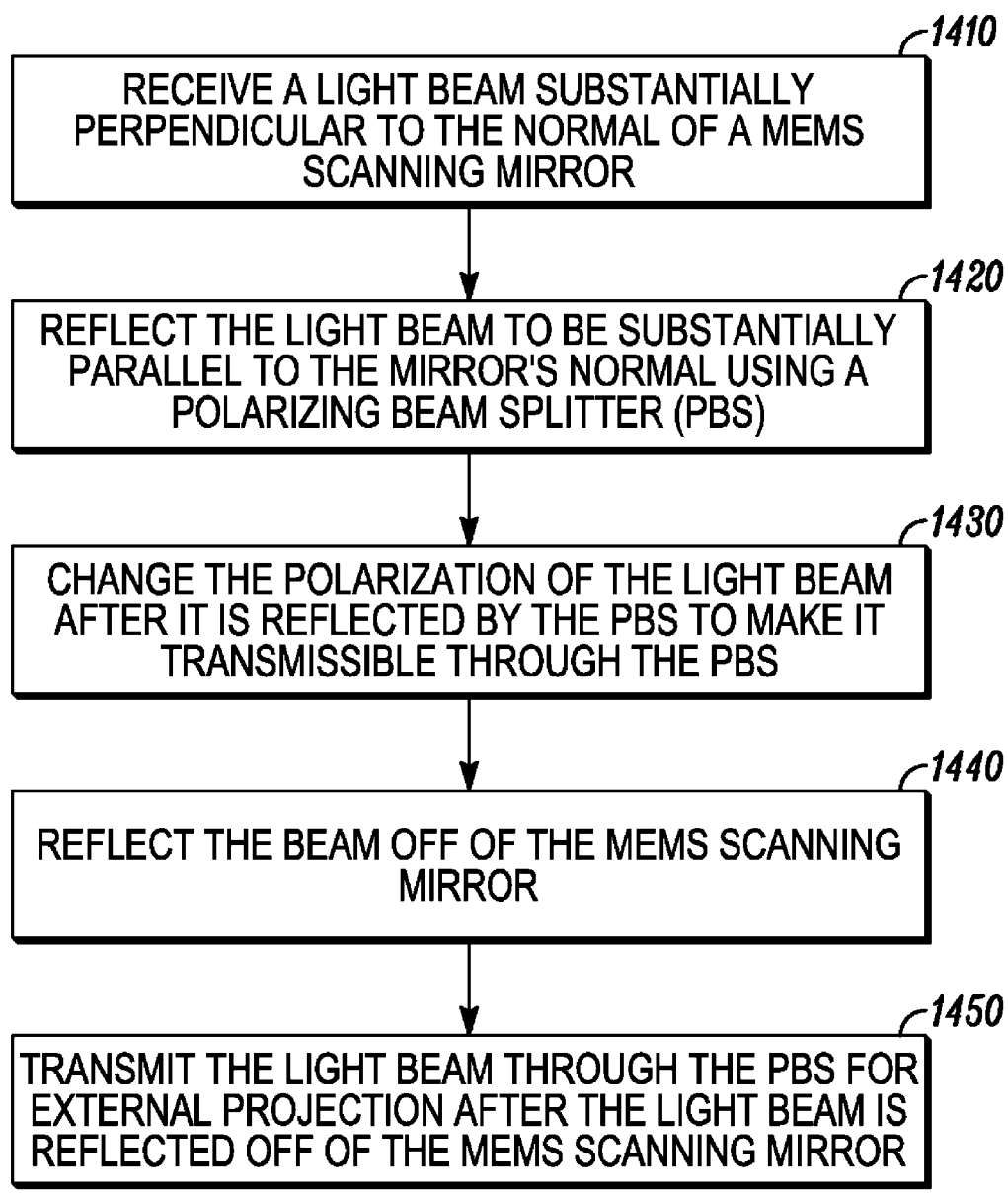
FIG. 14 is a flow diagram for projecting an input beam using a selective fold mirror in accordance with one or more embodiments.

FIG. 14 is a flow diagram 1400 for projecting an input beam using a selective fold mirror. At block 1410, a light beam may be received substantially perpendicular to the normal of the MEMS scanning mirror. For example, referring back to FIGS. 1 and 3, composite beam 130 may be generated by light sources 150 and may travel along a path substantially perpendicular to the normal of mirror 141 of MEMS scanners 140 or 340.

At block 1420, the light beam may be reflected to be substantially parallel to the mirror's normal using a polarizing beam splitter. For example, as shown in FIGS. 1 and 3, composite beam 130 may be reflected by selective fold mirrors 110 or 310. The reflected beams 132 or 332 may be substantially parallel to the normal of the mirror of MEMS scanners 140 or 340.

At block 1430, the polarization of the light beam may be changed after it is reflected by the polarizing beam splitter (PBS) to make it transmissible through the PBS. For example, as shown in FIGS. 1 and 3, composite beam 130 may initially be s-polarized and after being reflected towards MEMS scanners 140 or 340, it may be passed through polarization rotators 120 or 320. Polarization rotators may change the polarity of the beam to p-polarized and thereby make them capable of passing through selective fold mirrors 110 or 310.

At block 1440, the beam may be reflected off of the MEMS scanning mirror. The mirrors of MEMS scanners 140 or 340 (FIGS. 1 and 3) may reflect the beam back towards selective fold mirrors 110 or 310, respectively.

At block 1450, the light beam may be transmitted through the PBS for external projection after the light beam is reflected off of the MEMS scanning mirror. For example, as shown in FIGS. 1 and 3, beams 134 and 136, respectively may be reflected off of the mirror of MEMS scanner 140 or 340. Beams 134 and 136 may be p-polarized and thereby may pass through selective fold mirrors 110 or 310 for external projection.

Figure 15:
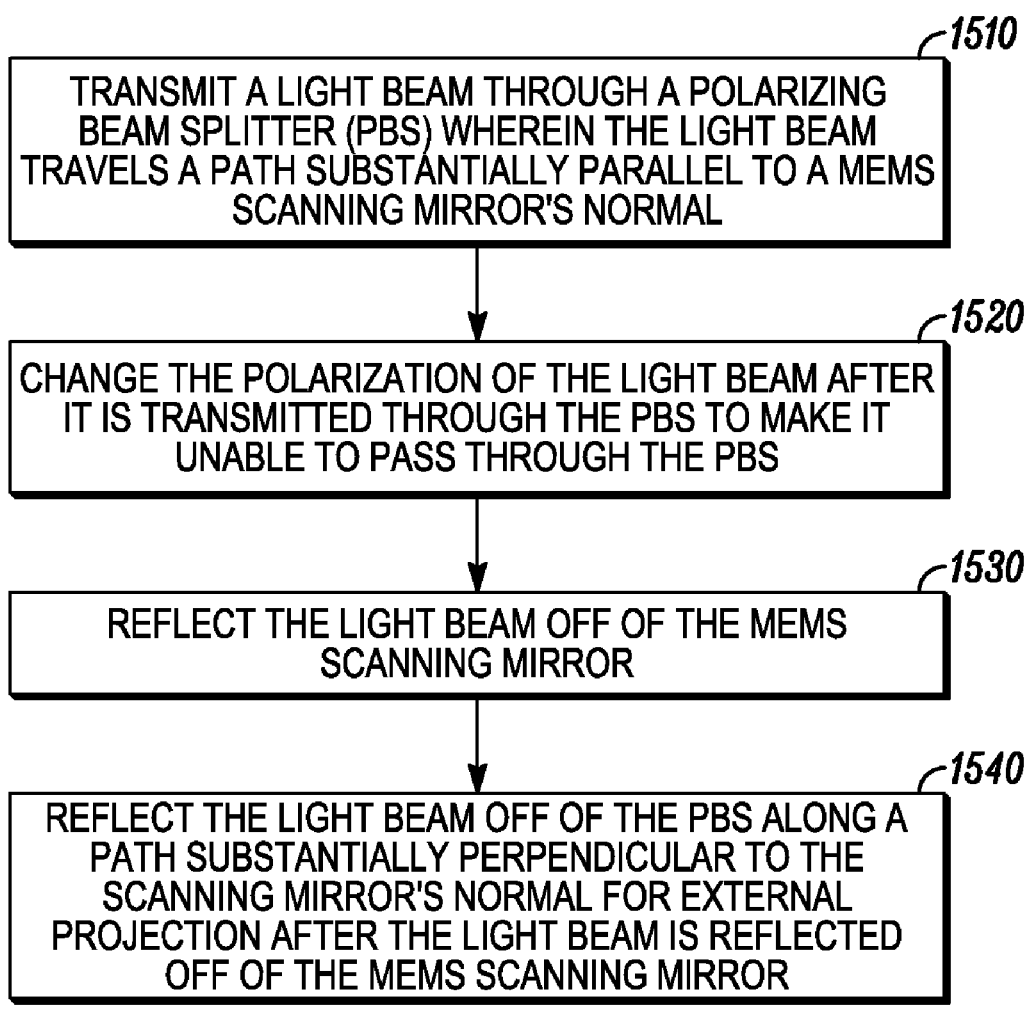
FIG. 15 is a flow diagram for projecting an input beam using a selective fold mirror in accordance with one or more embodiments.

FIG. 15 is a flow diagram 1500 for projecting an input beam using a selective fold mirror. At block 1510, a light beam may be transmitted through a polarizing beam splitter (PBS) wherein the light beam travels a path substantially parallel to a MEMS scanning mirror's normal. For example, referring back to FIG. 2, composite beam 130 may travel in a direction substantially parallel to the normal of the mirror of MEMS scanner 240. Alternatively, composite beam 130 may initially be traveling in a direction substantially perpendicular to the normal of the mirror of MEMS scanner 440 but may be reflected by a static mirror towards MEMS scanner 440 to travel in a direction substantially parallel to the mirror of MEMS scanner 440 prior to passing through polarizing beam splitter 410 (FIG. 4).

At block 1520, the polarization of the light beam may be changed after it is transmitted through the PBS to make it unable to pass through the PBS. For example, as shown in FIG. 2, polarization rotator 220 may change the polarity of composite beam 130 after the beam passes through selective fold mirror 210. Composite beam 130 may initially be p-polarized and thereby may be passes through selective fold mirror 210. After the beam's polarity changes to s-polarized by polarization rotator 220, the beam may be unable to pass through selective fold mirror 210 and may instead be reflected by the mirror.

At block 1530, the light beam may be reflected off of the MEMS scanning mirror. For example, beam 232 may be reflected by the mirror of MEMS scanner 240 (FIG. 2).

At block 1540, the light beam may be reflected off of the PBS along a path substantially perpendicular to the scanning mirror's normal for external projection after the light beam may be reflected off of the MEMS scanning mirror. For example, MEMS scanner 240 may reflect beam 232 towards selective fold mirror 210. Beam 232, now s-polarized, may be reflected by selective fold mirror 232 at about a 90 degree angle and thereby in a direction substantially perpendicular to the normal of the mirror of MEMS scanner 240.

FIG. 16 is a flow diagram 1600 for projecting an input beam using two static mirrors. At block 1610, a light beam may be reflected off of a first static mirror toward a MEMS scanning mirror from an incident path that is substantially perpendicular to the scanning mirror's normal. For example, referring back to FIG. 6, composite beam 130 may be reflected by first static mirror 610 towards MEMS scanner 640.

At block 1620, the light beam may be reflected off of the MEMS scanning mirror toward a second static mirror. For example, beam 634 may be reflected by the mirror of MEMS scanner 640 towards second static mirror 620.

At block 1630, the light beam may be reflected from the MEMS scanning mirror off of a second static mirror along a path substantially perpendicular to the scanning mirror's normal for external projection. For example, second static mirror 620 may reflect beam 634 for external projection. Beam 636 reflected by second static mirror 620 may travel in a direction substantially perpendicular to the normal of the mirror of MEMS scanner 640.

FIG. 17 is a flow diagram 1700 for projecting an input beam using a prism with a polarization reflective coating. At block 1710, a light beam may be transmitted through a total internal reflection prism wherein the light beam enters the prism along a path substantially perpendicular to a MEMS scanning mirror's normal, and after being reflected with the prism, exits the prism along a second path towards the MEMS scanning mirror. For example, referring back to FIG. 7, composite beam 130 may be p-polarized and may travel in a direction substantially perpendicular to the normal of the mirror of MEMS scanner 740. Composite beam 130 may enter prism 710 and be internally reflected off of a first surface 712 towards MEMS scanner 740 and exits prism 710.

At block 1720, the beam may be transmitted after it exits the prism, through a quarter wave plate. For example, beam 732 may be refracted by second surface 714 of prism 710 towards MEMS scanner 740. A polarization rotator may be positioned in front of MEMS scanner 740 for the beam to pass through prior to being reflected by the mirror of MEMS scanner 740.

At block 1730, the beam may be reflected off of the scanning mirror and through the quarter wave plate. For example, beam 736 may be reflected by the mirror of MEMS scanner 734 and through the polarization rotator positioned in front of MEMS scanner 734. The polarization rotator may change the polarity of the beam to be s-polarized in order to prevent it from passing through a polarization reflective coating.

At block 1740, the beam may be reflected from the quarter wave plate off of a reflective surface for external projection. For example, the now s-polarized beam 736 may be reflected by surface 714 of prism 710 which may be coated with a polarization reflective coating. Reflected beam 738 may be externally projected on a screen.

FIG. 18 is a flow diagram 1800 for projecting an input beam using two prisms. At block 1810, a light beam may be transmitted through a total internal reflection prism wherein the light beam enters the prism along a path substantially perpendicular to a MEMS scanning mirror's normal, and after being reflected within the prism, exits the prism along a second path towards the MEMS scanning mirror. For example, referring back to FIG. 8, composite beam 130 may be of any type of polarity and may travel in a direction substantially perpendicular to the normal of the mirror of MEMS scanner 840. Composite beam 130 may enter prism 810 and be internally reflected off of a first surface 812 towards MEMS scanner 840 and exits prism 810.

At block 1820, the beam may be reflected off of the scanning mirror. For example, beam 834 exiting prism 810 may be reflected by the mirror of MEMS scanner 840.

At block 1830, the beam from the scanning mirror may be reflected off of a second prism through which the beam passed before being reflected by the scanning mirror for external projection. For example, prior to being reflected by the mirror of MEMS scanner 840, beam 832 may exit prism 810, enter second prism 820 and be refracted by surface 822 of second prism 820 towards MEMS scanner 840. Beam 835 that may be reflected by the mirror of MEMS scanner 840 may be directed towards second mirror 820. Beam 835 may enter second prism 820 at or beyond the critical angle of surface 822 of second prism 820 such that surface 822 reflects beam 836 for external projection.

FIG. 19 is a flow diagram 1900 for projecting an input beam using an optical component. At block 1910, a light beam may be received incident a first surface of an optical component and be internally reflected towards a second surface of the optical component. For example, as shown in FIG. 9, input beam 130 may be received by first surface 912 of optical component 910 and be internally reflected towards second surface 914 of optical component 910.

At block 1920, the light beam, exiting the optical component from the second surface, may be reflected off of a MEMS scanning mirror back through the optical component for external projection. For example, as shown in FIG. 10, MEMS scanner 940 may reflect the light beam back towards optical component 910 for externally projecting beam 934.

At block 1930, the light beam from the MEMS scanning mirror may be received along a first path at a first angle relative to a normal of an optical slab of the optical component, where the optical slab has a thickness and an index. For example, as shown in FIG. 11, light beam 1122 reflected by MEMS scanner 940 may travel along a first path that forms a first angle θ with normal 1130 of slab component 1100 having thickness 1030 and index 1110.

At block 1940, the light beam may be refracted through the optical slab such that the light beam exits the optical slab along a second path at an angle relative to the normal of the optical slab having a value equal to the value of the first angle, where a distance between the first path and the second path is a function of the thickness or index value of the optical slab. For example, as shown in FIG. 11, light beam 1122 may be refracted by slab component 1100 and may exit slab component 1100 along a second path as light beam 1124. The angle of light beam 1124 has the same value as the angle formed by light beam 1122 with normal 1130. Light beam 1124 may be separated from where light beam 1122 would have been projected, absent the properties of slab component 1100, by amount 1120 which is a function of thickness 1030 or index 1110. This reduces the height of scanned projection cone of light beam 1122 to scanned projection cone 920 formed by light beam 1124.

FIG. 20 is a flow diagram 2000 for projecting an input beam using a reflective surface that is spatially separated in the vertical direction from a MEMS scanner. At block 2010, a MEMS scanning mirror may be positioned along a first plane oriented in a first direction of a first dimension.

At block 2020, a light beam may be reflected from a first path off of a first reflective surface towards the MEMS scanning mirror. The first reflective surface may be positioned along a second plane oriented in a second direction of the first dimension. The first and the second planes may be spatially separated along a second dimension. For example, referring back to FIGS. 9 and 10, MEMS scanner 1240 and 1340 may be positioned along a first plane oriented in a first direction and first reflective surface 1210 and 1320 may be positioned along a second plane oriented in a second direction. MEMS scanner 1240 and 1340 may be spatially separated in the vertical direction from first reflective surface 1210. First reflective surface 1210 may receive a light beam and reflect the beam towards MEMS scanner 1240 in the vertical direction.

Figure 21A:
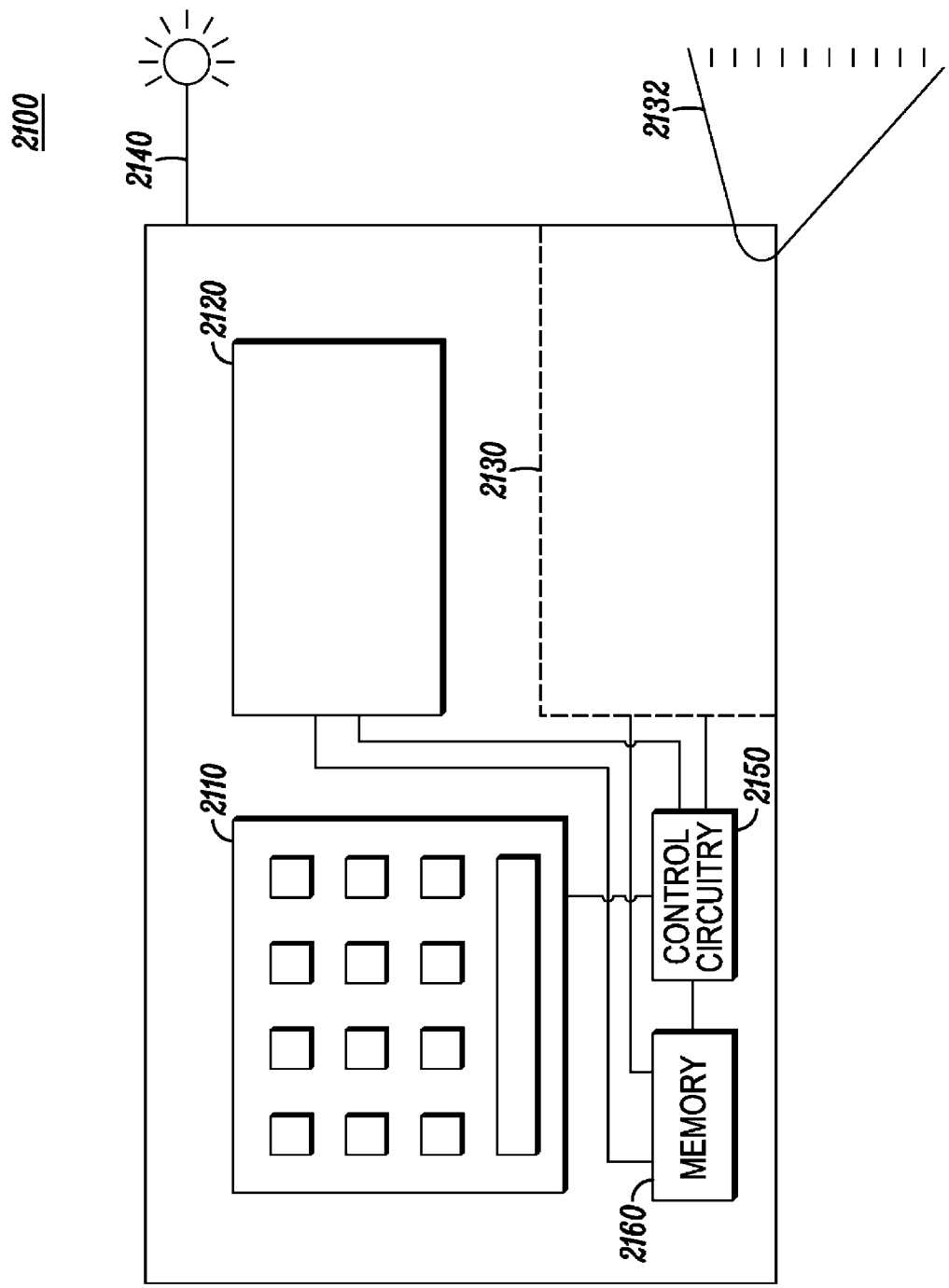
Figure 21B:
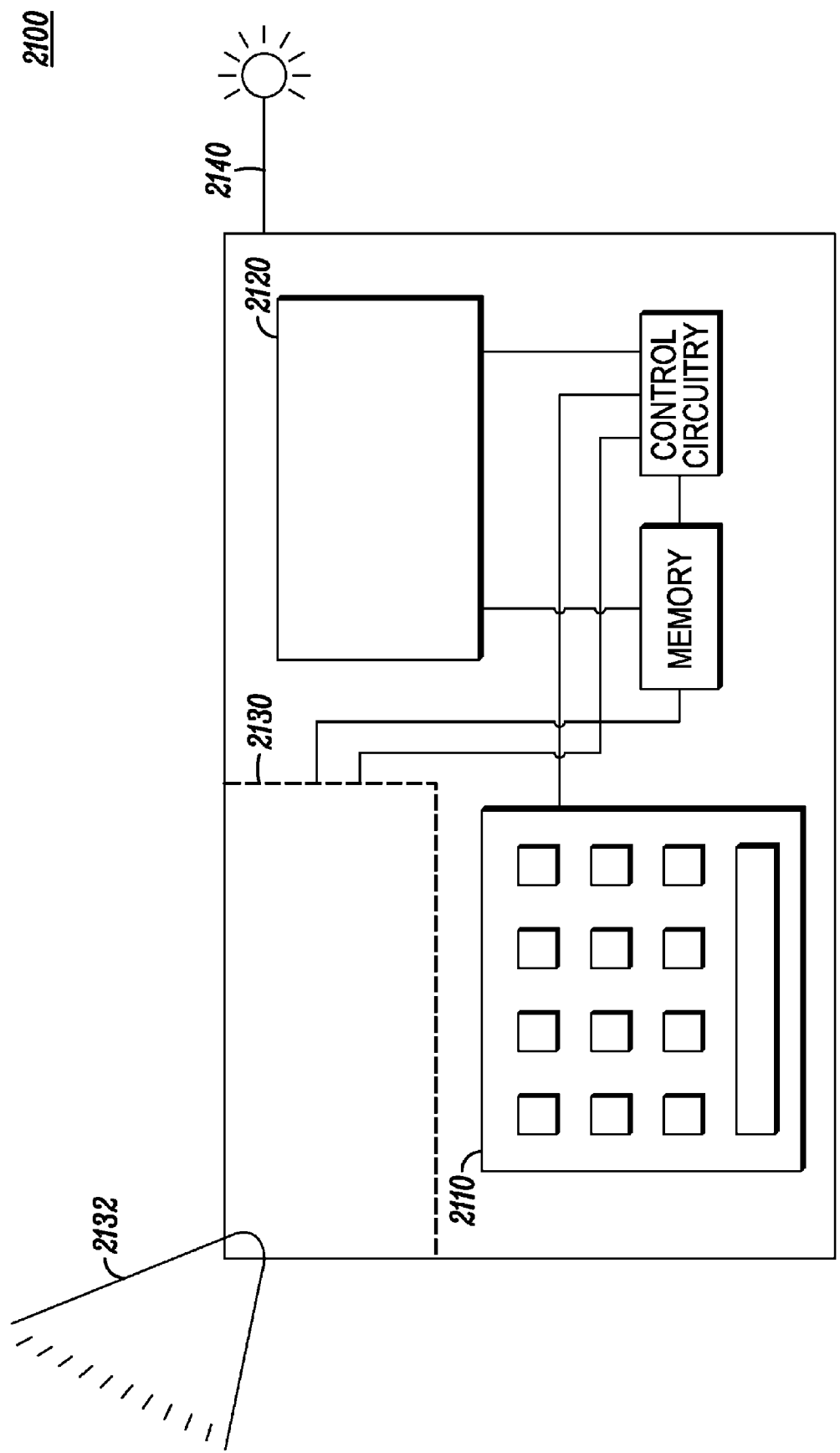
Figure 21C:
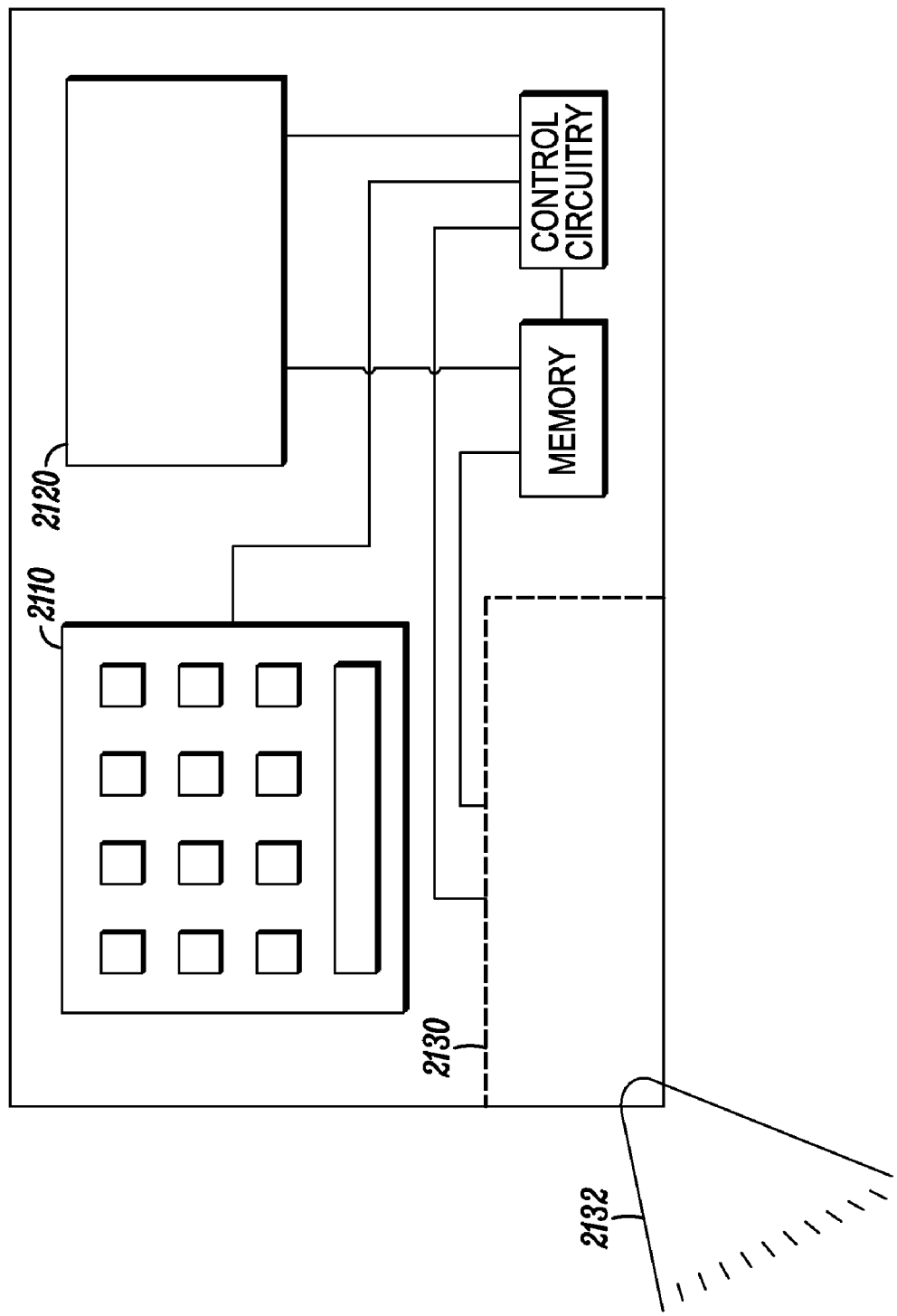
Figure 21D:
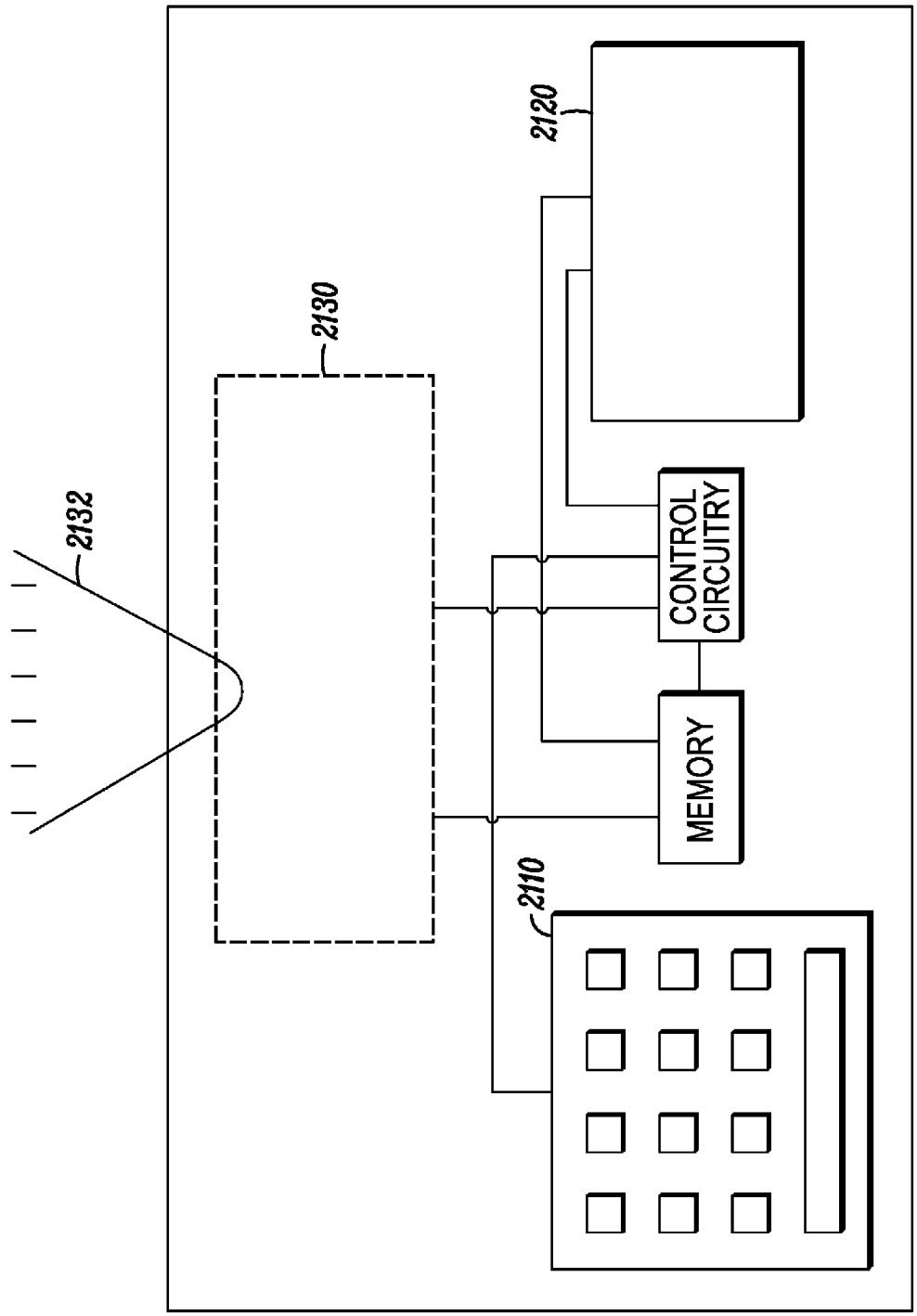

FIG. 21*a* is a diagram of a projector housed in a portable device 2100. Device 2100 may include a keypad 2110, a screen 2120, an antenna 2140, and a projector 2130 housed inside of device 2100. Although the antenna is drawn as extending outside of device 2140, it should be understood that antenna may be housed inside of device 2100 and may be positioned anywhere within the device.

Device 2100 may be any small form-factor device. Such devices may include a computing device, a portable device, a wireless device, a cell phone, a portable DVD player, a portable television device, a laptop, a portable e-mail device, a portable music player, a personal digital assistant, or any combination of the same.

Projector 2130 may project a beam 2132 in accordance with any one of the projectors described above in connection with FIGS. 1-10, 12 and 13. Depending on the arrangement of components within device 2100, it may be desirable to project beam 2132 using one of the projectors described above. For example, antenna 2140 or screen 2120 may use of components that may conflict with components of projector 2130. Conflicts may come about because of component sizes or electrical characteristics. In such circumstances, projector 2130 may project a beam using various combinations of other components such as static mirrors, prisms, and/or selective fold mirrors and polarization rotators to resolve the conflicts. For example, in some embodiments a single prism may require a smaller amount of space than a selective fold mirror and polarization rotator. Thus, one can replace the selective fold mirror and polarization rotator with a single prism.

Figure 21E:
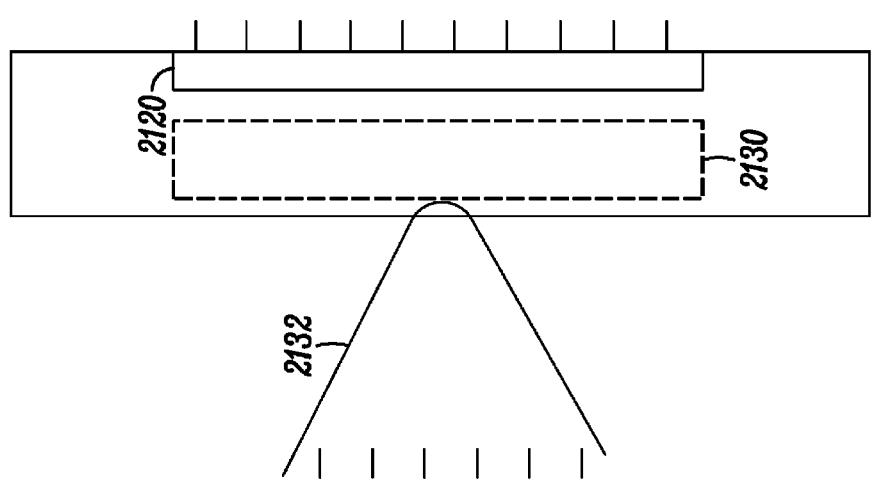
Figure 21F:
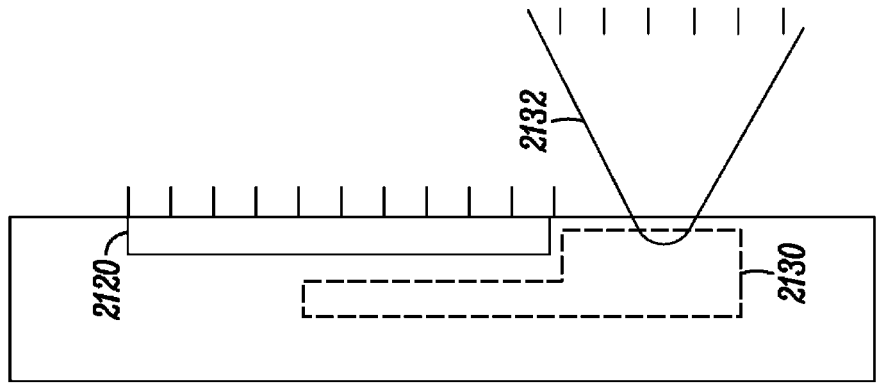

Projector 2130 may project an image using beam 2132 that may be displayed on screen 2120. Alternatively, screen 2120 may display a different image than the one displayed. Although beam 2132 and projector 2130 are drawn in the device on a side opposite from the position of antenna 2140, it should be understood that projector 2130 and beam 2132 may be positioned in any location on device 2100. For example, projector 2130 may be positioned along the length of width of device 2100 and may project beam 2132 along either the length or width of device 2100. Alternatively, it may be desirable to project beam 2132 from the back or the front of device 2100 such that screen 2120 and beam 2132 are displayed/projected in the same or opposite planes/directions (FIGS. 21*e-f*).

FIG. 21*b* through FIG. 21*f* are diagrams of alternative positions and directions in which projector 2130 may be housed in device 2100 and in which beam 2132 may be projected.

Keypad 2110 may be used to change various characteristics of the projected image. Such characteristics may include the brightness, sharpness, changing the displayed image, modifying the position of the displayed image, or any combination of the same.

Control circuitry 2150 may also be housed in device 2100. Control circuitry 2150 may control the various operations of device 2100. For example, control circuitry 2150 may detect which input key may be pressed on keypad 2110 and may perform an action based on the input key. Control circuitry 2150 may also communicate with screen 2120 and projector 2130 to instruct projector 2130 and screen 2120 to display images. Control circuitry 2150 may also control what is displayed in screen 2120 and beam 2132 based on an input received by keypad 2110.

Control circuitry 2150 may also compute an algorithm specific to device 2100. For example, in a cell-phone device, control circuitry 2150 may compute Fourier Transforms and Inverse Fourier Transforms to send and receive voice and data signals through antenna 2140. Control circuitry 2150 may also communicate with a memory 2160 to retrieve stored information. Memory 2160 may store information that includes calendar, contacts, video data, or other device specific data. Control circuitry may retrieve the information from memory 2160 and cause projector 2130 or screen 2120 to display the retrieved information. In some embodiments, the retrieved information may be an image, a slide from a presentation, a video, or any combination of the same.

Referring now to FIG. 22, a block diagram of a projector in accordance with one or more embodiments will be discussed. In one or more embodiments, projector 2200 comprises a housing 2202 having a relatively compact and smaller size form factor capable of being integrated in and/or with smaller sized electronic devices such as cellular telephones, personal digital assistants (PDAs), cameras, video recorders, music players, video players, and/or multimedia players, portable computers, and so on. In one or more embodiments, projector 2200 may be referred to as an integrated photonics module. Although projector 2200 of FIG. 22 shows a particular layout and orientation of its internal components, projector 2200 may be produced as a mirror image of the arrangement shown in FIG. 22 according to the design of the product or system for which projector 2200 is intended to be utilized. Projector 2200 may comprise one or more light sources 2204, 2206, and 2208 which may comprise, for example, a red laser source, a blue laser source, and a green laser source, respectively. so that projector 2200 may be capable of projecting a color display image. Alternatively, projector 2200 may comprise more or fewer light sources, for example if projector 2200 is only intended to project a monochromatic display image. Light sources 2204, 2206, and/or 2208 may have respective beam shaping optics 2210, 2212, and/or 2214 in order to shape the emitted laser beams to have a desired shape and/or profile. For example, such beam shaping optics 2210, 2212, and/or 2212 may include a top hat lens, a circularizer lens, and so on, so that the emitted laser beams and resulting beam spots have a profile and/or shape tailored to the application for which projector 2200 is intended. Likewise, housing 2202 may include one or more beam combiners 2216, 2218, and/or 2220 to combine one or more of the beams emitted from light sources 2204, 2206, and/or 2208 into a single beam. Beam combiners 2216, 2218, and/or 2220 may comprise dichroic mirrors to pass and/or reflect desired colors so that a light beam may either pass through a given beam combiner or be reflected by the beam combiner. For example, beam combiner 2218 may be designed to allow the green laser beam emitted from light source 2208 to pass there through, while also reflecting the blue laser beam emitted from light source 2206 so that the green laser beam and the blue laser beam may be combined by beam combiner 2218. Likewise, beam combiner 2220 may reflect the combined green and blue laser light beams, while also allowing the red laser beam emitted from light source 2204 to pass there through so that the green, blue, and red laser beams may be combined by beam combiner 2220 to be directed toward prism 2226, and passing through optional lens 2224 if present. In one or more embodiments, housing 2202 may include a total internal reflective (TIR) optic 2222, also referred as a periscope, to redirect a laser beam to be in the same plane, or nearly the same plane, as one or more other laser beams depending upon the design and form factor of housing 2202. However, these are merely example arrangements and layouts of various optical devices, dichroic elements, and/or components of projector 2200, for example in some embodiments no beam combining may be utilized, and the scope of the claimed subject matter is not limited in these respects.

In one or more embodiments, projector 2200 may include a lens 2224 to focus the combined laser beams emitted from light sources 2204, 2206, and/or 2208 to focus the image provided by projector 2200 at a predetermined focal distance from projector 2200. For example, if projector 2200 is intended to be utilized in a head-up display (HUD) system, lens 2224 may provide a focal distance of approximately 70 mm in one or more embodiment. Alternatively, if projector 2200 is intended by used in a typical projector system to project an image on a remote display surface, lens 2224 may not be required and there fore projector may have an infinite, or nearly infinite, focal distance. However, these are merely example application in which lens 2224 may be utilized, or optionally not utilized, and the scope of the claimed subject matter is not limited in these respects.

In one or more embodiments, the combined laser beam may enter into prism 2226 having one or more internal reflective surfaces for example to function as a fold mirror and redirect the beam to MEMS scanner 2228 so that MEMS scanner 2228 may generate a raster scan and generate an image to be displayed. As discussed herein, such a MEMS scanner may comprise a scanning mirror capable of being modulated about one or two or more orthogonal, or nearly orthogonal, axes, to reflect the beam in a controlled pattern. As shown in FIG. 22, the beam may exit prism 2226 to be reflected by the scanning mirror of MEMS scanner 2228. The beam may be reflected off of the scanning mirror and pass again through prism 2226 to be projected as an image by projector 2200. In one or more embodiments, as will be discussed in further detail, below, prism 2226 may be capable of providing a controlled polarization of the laser beam, and further may be capable of correcting distortion that would otherwise be present in the image displayed by projector 2200.

Referring now to FIG. 23, a top plan view of a prism capable of being utilized to provide distortion and/or polarization alteration in a MEMS based display or the like in accordance with one or more embodiments will be discussed. In one or more embodiments, alteration of a characteristic generally may comprise imparting a desired change in the characteristic, which may include, for example, reduction, increase, elimination and/or correction of distortion in a projected image, and/or a change in one or more polarization components of a beam of light utilized to generate a projected image at one or more points on a path along which the beam travels. However, these are merely examples of alteration of distortion and/or polarization, and the scope of the claimed subject matter is not limited in this respect. The prism 2226 of projector 2200 as shown in FIG. 22 is shown in FIG. 24 as a top plan view to illustrate the path of the light beam 2400 as it passes through prism 2226. In one or more embodiments, incoming light beam 2400 enters prism 2226 as window 2401 and is reflected off of surface 2402. Surface 2402 may comprise a total internal reflective (TIR) surface to reflect all or substantially all of incoming light beam 2400 as reflected light beam 2404. Likewise, light beam 2404 is then directed to and reflected off of surface 2406 which may also comprise a TIR surface to reflect all or substantially all of light beam 2404 as reflected light beam 2408. Furthermore, light beam 2408 is then directed to and reflected off of surface 2410 which may also comprise a TIR surface to reflect all or substantially all of light beam 2408 as reflected light beam 2412 which is directed to exit prism 2226 at window 2414 and impinge on MEMS scanner 2228. MEMS scanner 2228 then reflects light beam 2414 to generated reflected light beams 2418 via modulation of scanning mirror 2416 of MEMS scanner 2228 in a predetermined pattern, for example in a raster scan to generate a desired image. Reflected beams 2418 pass back into prism 2226 via window 2414 and exit prism via window 2230 as a projected image of projector 2200.

Thus, in one or more embodiments, one function of prism 2226 is to redirect an incoming beam 2400 so that the beam may impinge on MEMS scanner 2228 as an appropriate incoming angle and to be exit projector 2200 at an appropriate exit angle. This first function of prism 2226 allows the beam to be directed to MEMS scanner 2228 without increasing the scan cone by an undesirable amount which would otherwise result in adding distortion to the projected image. A second function of prism 2226 is to provide a desired polarity of the beam impinging on MEMS scanner 228. This second function may be achieved at least in part via a desired change in polarization of the incoming beam 2400 by one or more of surface 2402, surface 2406, and/or surface 2410. The amount of change in the polarization state imparted to beams 2400, 2404, 2408, and/or 2412 may be controlled by controlling the angles of one or more of surfaces 2402, 2406, and/or 2410 to result in a desired polarity of beam 2412. It should be noted that prism 2226 is represented in FIG. 23 as a top plan view. Therefore, the angles of reflection of the beam imparted by surfaces 2402, 2406, and 2410 are represented in a first plane parallel to a bottom surface of prism 2226. Furthermore, since prism 2226 is a three dimensional object, one or more of surfaces 2402, 2406, and/or 2410 may be angled so that at least some reflection of the beam occurs in a direction orthogonal to the bottom surface of prism 2226. Such three dimensional positioning of surfaces 2402, 2406, and/or 2410 is shown in and described with respect to FIG. 24, 25 and FIG. 26, below.

Referring now to FIG. 24, FIG. 25, and FIG. 26, an isometric view, a front elevation view, and side elevation view, respectively, of the prism of FIG. 23 in accordance with one or more embodiments will be discussed. For reference, it should be noted that FIG. 25 shows prism 2226 from the perspective of MEMS scanner 2228. As discussed, above, since prism 2226 is a three dimensional object, surfaces 2402, 2406, and/or 2410 may be oriented in any X, Y, or Z direction to impart a desired angle so that the amount of polarization change in the reflected beam may be appropriately selected. As shown in the embodiments of FIGS. 24-26, incoming beam 2401 may be reflected by surface 2402 in a horizontal direction so that the reflected beam 2404 impinges on surface 2406. However, beam 2404 may be reflected off of surface 2406 in both a horizontal and vertical direction toward second surface 2410. Thus, the resulting beam 2408 is directed in both horizontally and downwardly toward surface 2410. Likewise, surface 2410 reflects beam 2408 both horizontally and vertically toward MEMS scanner 2228 as beam 2412. Thus, the resulting beam 2412 is directed both horizontally and upwardly toward MEMS scanner 2228. The combination of the polarization imparted by the angles of reflection of surfaces 2402, 2406, and/or 2410 results in an overall desired polarization of beam 2412, which may be selected according to the desired angles and/or locations of the surfaces with respect to one another.

Such polarization alteration comprises a second function of prism 2226 so that the beams 2418 used to create the image displayed by projector 2200 have a desired, selected polarization. A third function provided by prism 2226 comprises alteration of distortion of the displayed image that may otherwise occur merely by using reflective surfaces, mirrors, or beam splitters. Such image distortion, which is sometimes referred to as "smile" distortion, may occur resulting from an off-axis feed of the beam to MEMS scanner 2228, which may result in an image that is at least partially curved in a first direction as shown in and described with respect to FIG. 31, below. Referring specifically to FIG. 26, this type of image alteration may be achieved via imparting a wedge design to prism 2226 by imparting an angle between surface 2710 having window 2414 and surface 2712 having window 2230. By orienting surface 2710 and surface 2712 at a non-parallel angle with respect to one another, the amount of smile distortion alteration in the projected image may be obtained based at least on the angle between surface 2710 and surface 2712. In one or more embodiments, prism 2226 may be designed to have the following example angles of reflection for the internal TIR surfaces in combination with the example angles for the external prism surfaces for points of entry and/or exit for beam 2400 as illustrated in Table 1, below. Such example angles may result in a desired amount of polarization adjustment and/or adjustment of smile distortion in the resulting image provided by projector 2200. It should be noted that the angles provided in Table 1 are merely example angles, and other angles may be provided depending on the particular design of the prism and/or projector, and the scope of the claimed subject matter is not limited in this respect.

TABLE 1

Example Tilt Angles for a Beam Folding Prism of a Projector

| Surface | X Tilt (degrees) | Y Tilt (degrees) |
| --- | --- | --- |
| Entry window 2401 | 0 | 0 |
| TIR surface 2402 | 0.3044 | 47.9117 |
| TIR surface 2406 | −15.4995 | −38.4758 |
| TIR surface 2410 | 30.9192 | 41.5559 |
| Prism surface 2710 | 16.5 | 0 |
| Prism surface 2712 | 3.8 | 0 |

Furthermore, the amount of distortion alteration may also be selectable based at least in part on selecting an appropriate index of refraction between the material from which prism 2226 is composed and the air interfaces to provide an appropriate amount of power and/or alteration. In one or more embodiments, a suitable material for prism 2226 may comprise E48 type plastic which is suitable for molding an appropriate shape for prism 2226. However, this is merely one example of a suitable material for prism 2226, and other suitable materials may likewise be utilized, for example glass, polycarbonate, and so on, and the scope of the claimed subject matter is not limited in this respect. In one or more embodiments, a fourth function of prism 2226 may comprise reducing and/or eliminating stray light that may occur in on axis beam feeding arrangements via beam splitting, although the scope of the claimed subject matter is not limited in this respect.

Referring now to FIG. 27, FIG. 28, FIG. 29, and FIG. 30, an isometric view, another isometric view, a side elevation view, and a top plan view, respectively, of an alternative prism capable of being utilized to provide distortion and/or polarization alteration in a MEMS based display or the like in accordance with one or more embodiments will be discussed. Prism 2800 is an alternative arrangement of prism 2226 and is substantially similar to prism 2226 and provides one or more or all of the same functions provided by prism 2226. Prism 2800 includes window 2802 for receiving an incoming beam to be directed toward MEMS scanner 2228 as shown in FIG. 24. Prism 2800 may also include a receptacle for receiving a lens, for example lens 2224. Prism 2800 further comprises surfaces 2806, 2808, and/or 2810 to reflect the incoming laser beam out of window 2812 and onto MEMS scanner 2228. The beam reflected by MEMS scanner 2228 may be reflected back into prism 2800 through window 2812 to exit prism 2800 via window 2814 as the output of projector 2814. As an alternative arrangement to prism 2226, prism 2800 may only have a portion of a surface 2816 corresponding to window 2812 disposed at an angle instead of a whole surface 2710 being angled as with prism 2226. Thus, surface 2816 and surface 2818 may be angled with respect to one another to impart a desired amount of image distortion alteration as likewise accomplished by surface 2710 and surface 2712 of prism 2226. Thus, one or more geometrical features of prism 2226 and/or prism 2800 may be designed to impart a desired amount of polarization and/or distortion alteration as discussed herein. Alteration of image distortion via prism 2226 and/or prism 2800 is shown in and described with respect to FIG. 32, below.

Referring now to FIG. 31, alteration of image distortion via a prism as shown in FIG. 23 and/or FIG. 27 in accordance with one or more embodiments will be discussed. As shown in FIG. 31, image 3200 may be displayed by projector 2200 as shown for example in FIG. 22. Image 3200 may have image distortion resulting from feeding the beam off axis to MEMS scanner 2228. Such image distortion due to off axis beam feeding may result in a non-square layout 3202 of image 3200. Such image distortion may be analogized to the change in a rectilinear image projected onto a spherical surface when image 3200 is actually projected onto a flat surface. In one or more embodiments, prism 2226 and/or prism 2800 is capable of correcting this image distortion when MEMS scanner 2228 is fed off axis to result in a generally square, rectilinear layout 3204 of image 3200 via the generally wedge shaped arrangement of surface 2710 with respect to surface 2712 of prism 2226 and/or surface 2816 with respect to 2818 of prism 2800 as discussed, above.

Although the claimed subject matter has been described with a certain degree of particularity, it should be recognized that elements thereof may be altered by persons skilled in the art without departing from the spirit and/or scope of claimed subject matter. It is believed that the subject matter pertaining to distortion and polarization alteration in MEMS based projectors or the like and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A prism capable of being utilized in a projector, comprising:
a first window disposed on a first surface through which the beam is capable of passing to impinge upon a scan engine at an angle of incidence off axis from an axis normal to a plane of the scan engine, wherein the scan engine is capable of directing the beam in a predetermined scan pattern;
a second window disposed on a second surface through which the beam is capable of passing;
wherein the first surface is non-parallel to the second surface to reduce distortion of the scan pattern from the scan engine; and
three or more internal surfaces capable of reflecting the beam onto the scan engine off axis via a combination of reflections, and further capable of imparting a desired polarization state to the beam reflected onto the scan engine via the combination of reflections, wherein at least one of the combination of reflections changes the direction of the beam in a first direction and in a second direction orthogonal to the first direction.

2. A prism capable of being utilized in a projector, comprising:
a first window disposed on a first surface through which the beam is capable of passing to impinge upon a scan engine at an angle of incidence off axis from an axis normal to a plane of the scan engine, wherein the scan engine is capable of directing the beam in a predetermined scan pattern;
a second window disposed on a second surface through which the beam is capable of passing;
wherein the first surface is non-parallel to the second surface to reduce distortion of the scan pattern from the scan engine; and
a receptacle formed in the prism for receiving a lens capable of providing a desired focal length for the scan pattern.

3. An integrated photonics module, comprising:
a housing;
a scan engine disposed in the housing;
one or more light sources disposed in the housing capable of generating a beam, wherein the scan engine is capable of directing the beam in a predetermined scan pattern; and
a prism capable of directing the beam onto the scan engine, the prism comprising:
a first window disposed on a first surface through which the beam is capable of passing to impinge upon the scan engine at an angle of incidence off axis from an axis normal to a plane of the scan engine;
a second window disposed on a second surface through which the beam is capable of passing;
wherein the first surface is non-parallel to the second surface to reduce distortion of the scan pattern from the scan engine; and
three or more internal surfaces capable of reflecting the beam onto the scan engine off axis via a combination of reflections, and further capable of imparting a desired polarization state to the beam reflected onto the scan engine via the combination of reflections, wherein at least one of the combination of reflections changes the direction of the beam in a first direction and in a second direction orthogonal to the first direction.

4. An integrated photonics module, comprising:
a housing;
a scan engine disposed in the housing;
one or more light sources disposed in the housing capable of generating a beam, wherein the scan engine is capable of directing the beam in a predetermined scan pattern; and
a prism capable of directing the beam onto the scan engine, the prism comprising:
a first window disposed on a first surface through which the beam is capable of passing to impinge upon the scan engine at an angle of incidence off axis from an axis normal to a plane of the scan engine;
a second window disposed on a second surface through which the beam is capable of passing;
wherein the first surface is non-parallel to the second surface to reduce distortion of the scan pattern from the scan engine; and
a receptacle formed in the prism for receiving a lens capable of providing a desired focal length for the scan pattern.

5. An electronic device, comprising:
control circuitry capable of controlling one or more operations of the electronic device;
a memory coupled to the control circuitry capable of storing information capable of being retrieved by the control circuitry; and
an integrated photonics module capable of being controlled by the control circuitry, the integrated photonics module comprising:
a scan engine;
one or more light sources capable of generating a beam, wherein the scan engine is capable of directing the beam in a predetermined scan pattern; and
a prism capable of directing the beam onto the scan engine, the prism comprising:
a first window disposed on a first surface through which the beam is capable of passing to impinge upon the scan engine at an angle of incidence off axis from an axis normal to a plane of the scan engine;
a second window disposed on a second surface through which the beam is capable of passing;
wherein the first surface is non-parallel to the second surface to reduce distortion of the scan pattern from the scan engine; and
three or more internal surfaces capable of reflecting the beam onto the scan engine off axis via a combination of reflections, and further capable of imparting a desired polarization state to the beam reflected onto the scan engine via the combination of reflections, wherein at least one of the combination of reflections changes the direction of the beam in a first direction and in a second direction orthogonal to the first direction.

6. An electronic device, comprising:
control circuitry capable of controlling one or more operations of the electronic device;
a memory coupled to the control circuitry capable of storing information capable of being retrieved by the control circuitry; and
an integrated photonics module capable of being controlled by the control circuitry, the integrated photonics module comprising:
a scan engine;
one or more light sources capable of generating a beam, wherein the scan engine is capable of directing the beam in a predetermined scan pattern; and
a prism capable of directing the beam onto the scan engine, the prism comprising:
a first window disposed on a first surface through which the beam is capable of passing to impinge upon the scan engine at an angle of incidence off axis from an axis normal to a plane of the scan engine;
a second window disposed on a second surface through which the beam is capable of passing;
wherein the first surface is non-parallel to the second surface to reduce distortion of the scan pattern from the scan engine; and
a receptacle formed in the prism for receiving a lens capable of providing a desired focal length for the scan pattern.

7. A method to reduce distortion in a scanned beam display due to providing and off axis beam feed, comprising:
directing a beam through a first window disposed on a first surface to impinge upon a scan engine at an angle of incidence off axis from an axis normal to a plane of the scan engine, wherein the scan engine is capable of directing the beam in a predetermined scan pattern;
directing the beam through a second window disposed on a second surface;
wherein the first surface is non-parallel to the second surface to reduce distortion of the scan pattern from the scan engine; and
reflecting the beam off of two or more internal surfaces capable to reflect the beam onto the scan engine off axis via a combination of reflections, the reflecting comprising imparting a desired polarization state to the beam reflected onto the scan engine via the combination of reflections.

8. A method to reduce distortion in a scanned beam display due to providing and off axis beam feed, comprising:
directing a beam through a first window disposed on a first surface to impinge upon a scan engine at an angle of incidence off axis from an axis normal to a plane of the scan engine, wherein the scan engine is capable of directing the beam in a predetermined scan pattern;
directing the beam through a second window disposed on a second surface;
wherein the first surface is non-parallel to the second surface to reduce distortion of the scan pattern from the scan engine; and
reflecting the beam off of three or more internal surfaces to reflect the beam onto the scan engine off axis via a combination of reflections, the reflecting comprising imparting a desired polarization state to the beam reflected onto the scan engine via the combination of reflections, wherein at least one of the combination of reflections changes the direction of the beam in a first direction and in a second direction orthogonal to the first direction.

* * * * *